Dec. 28, 1965   H. J. MUMMA   3,225,948
MACHINE FOR HANDLING EGGS
Filed Oct. 31, 1960   24 Sheets-Sheet 1
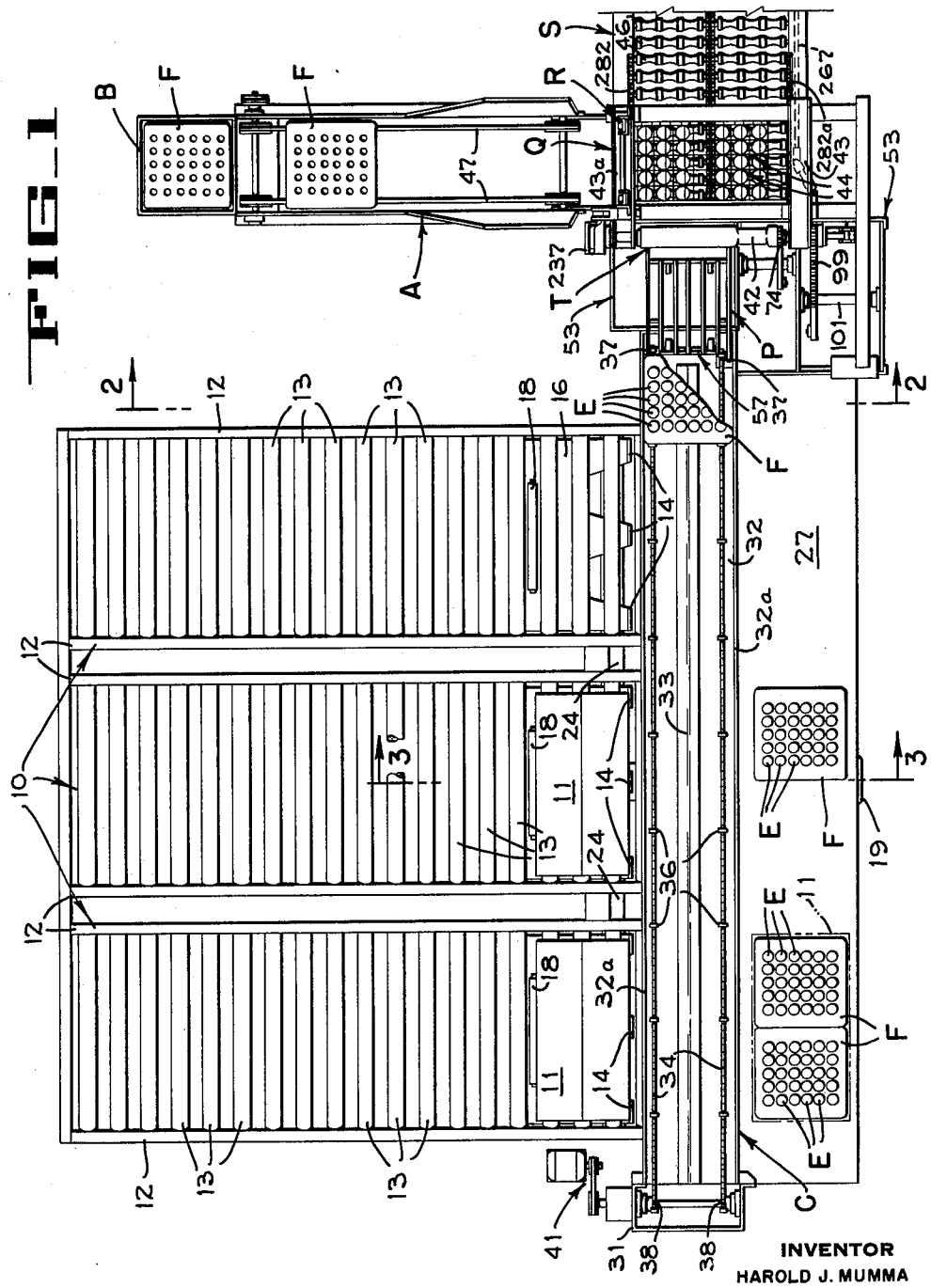
INVENTOR
HAROLD J. MUMMA
BY
ATTORNEY

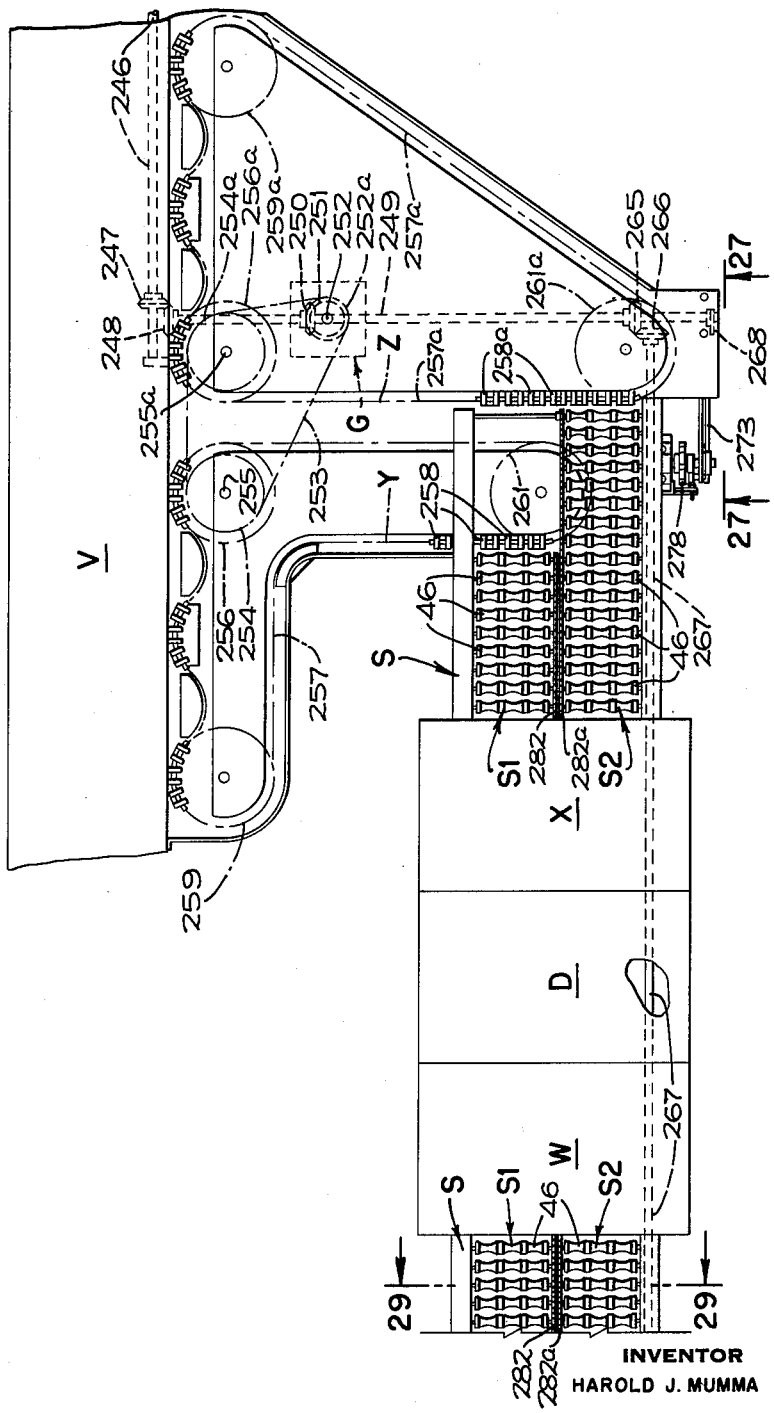

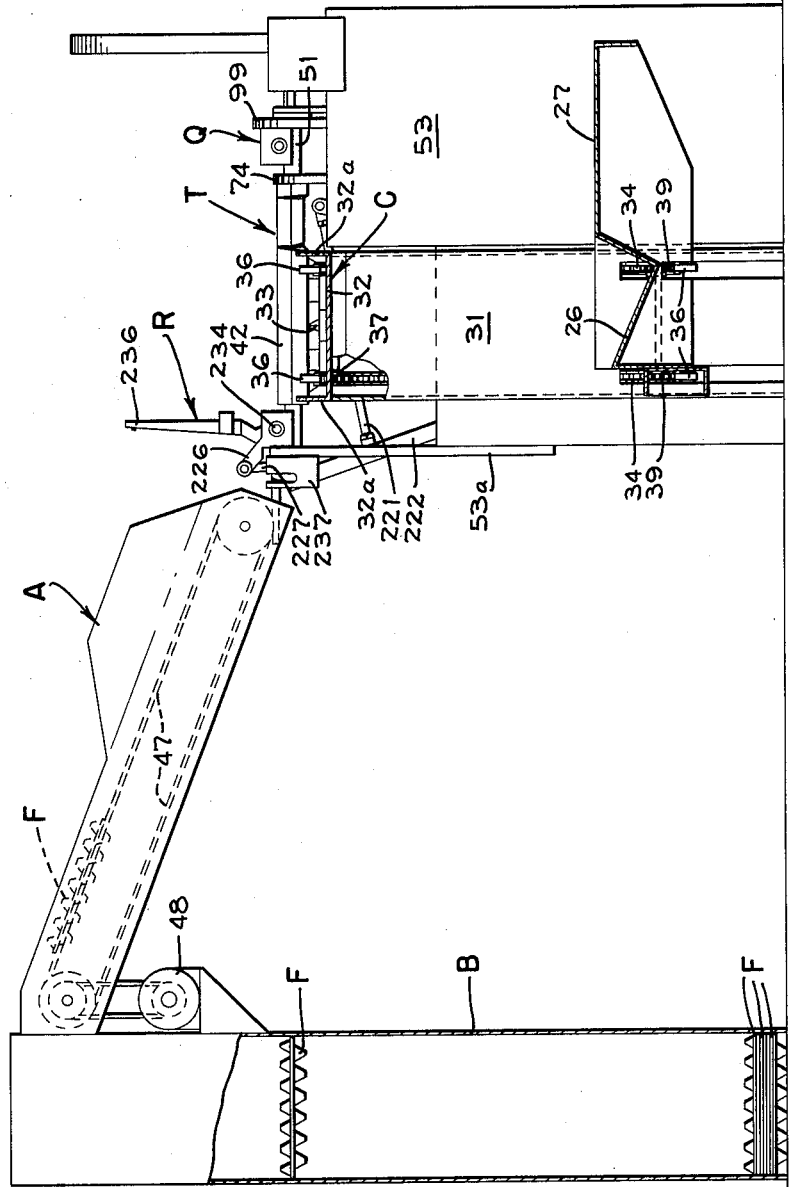

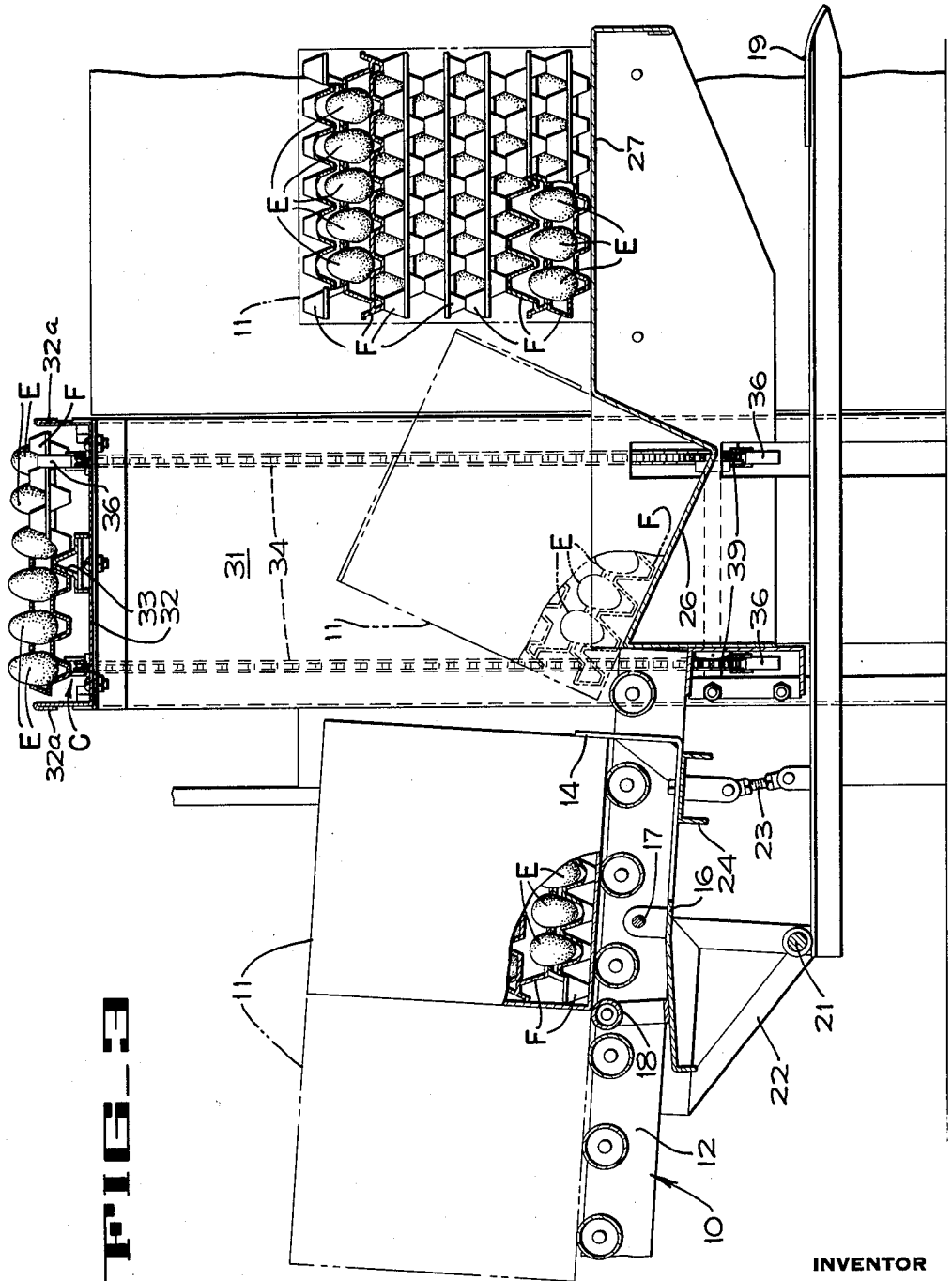

Dec. 28, 1965   H. J. MUMMA   3,225,948
MACHINE FOR HANDLING EGGS
Filed Oct. 31, 1960   24 Sheets-Sheet 5

FIG_4

INVENTOR
HAROLD J. MUMMA
BY Hans G. Hoffmeister
ATTORNEY

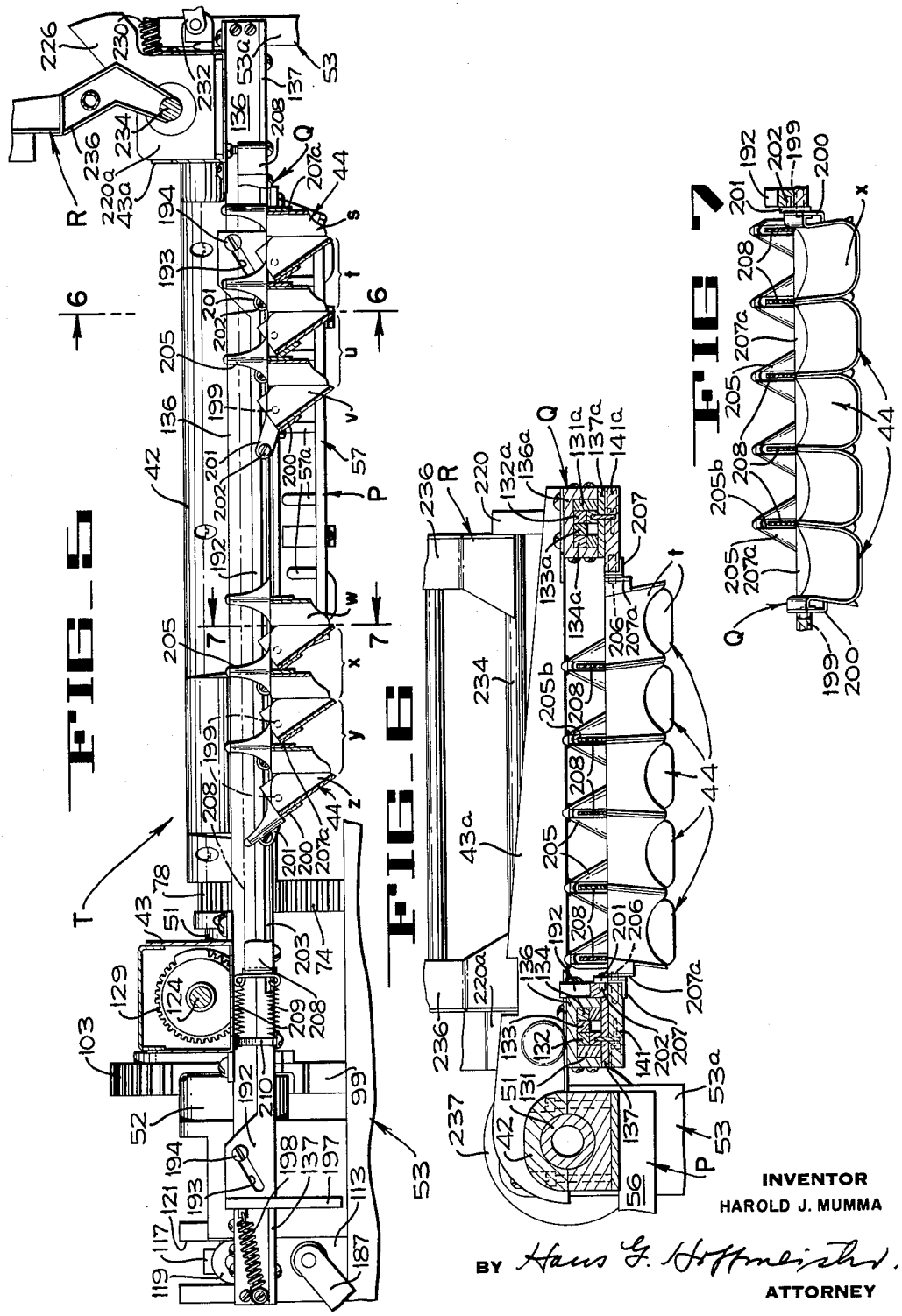

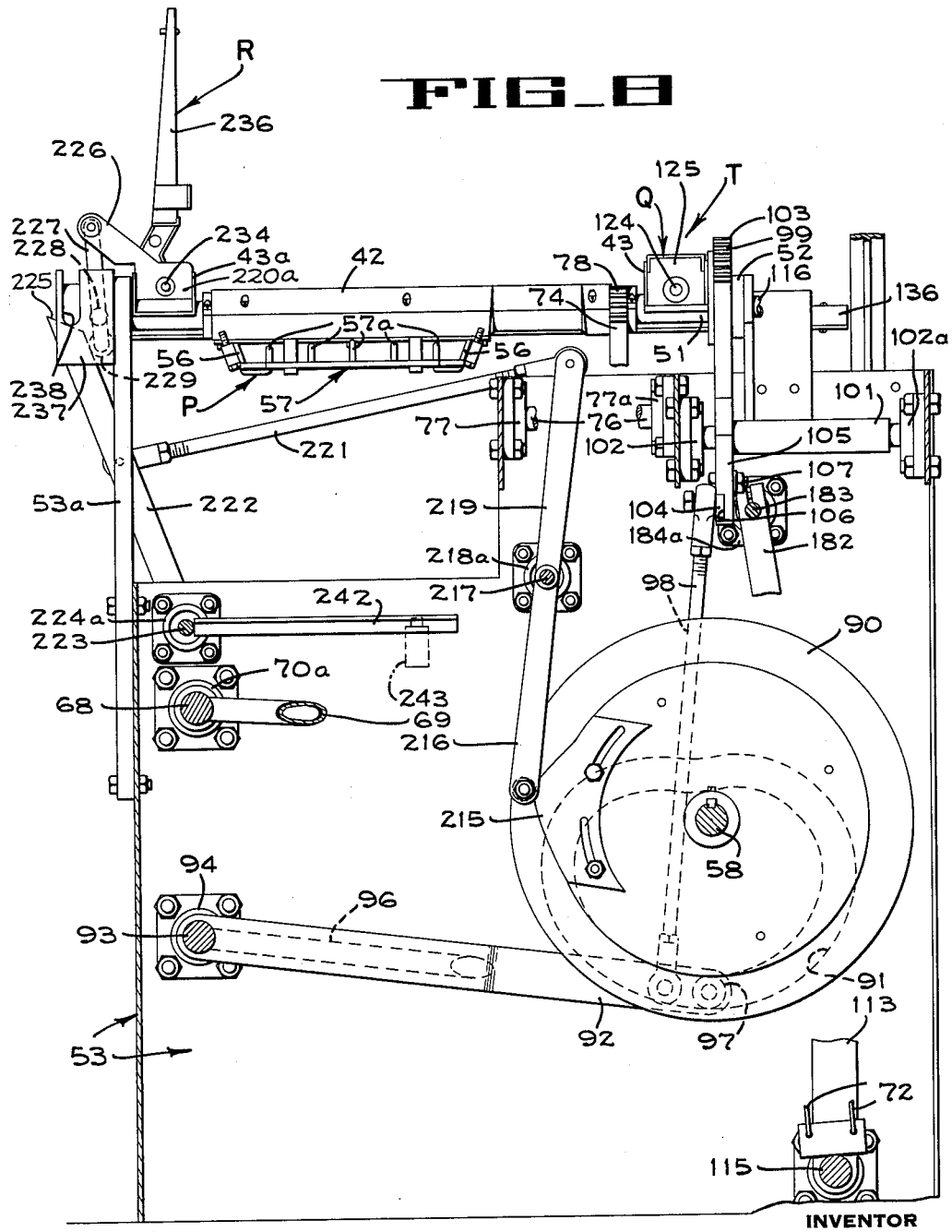

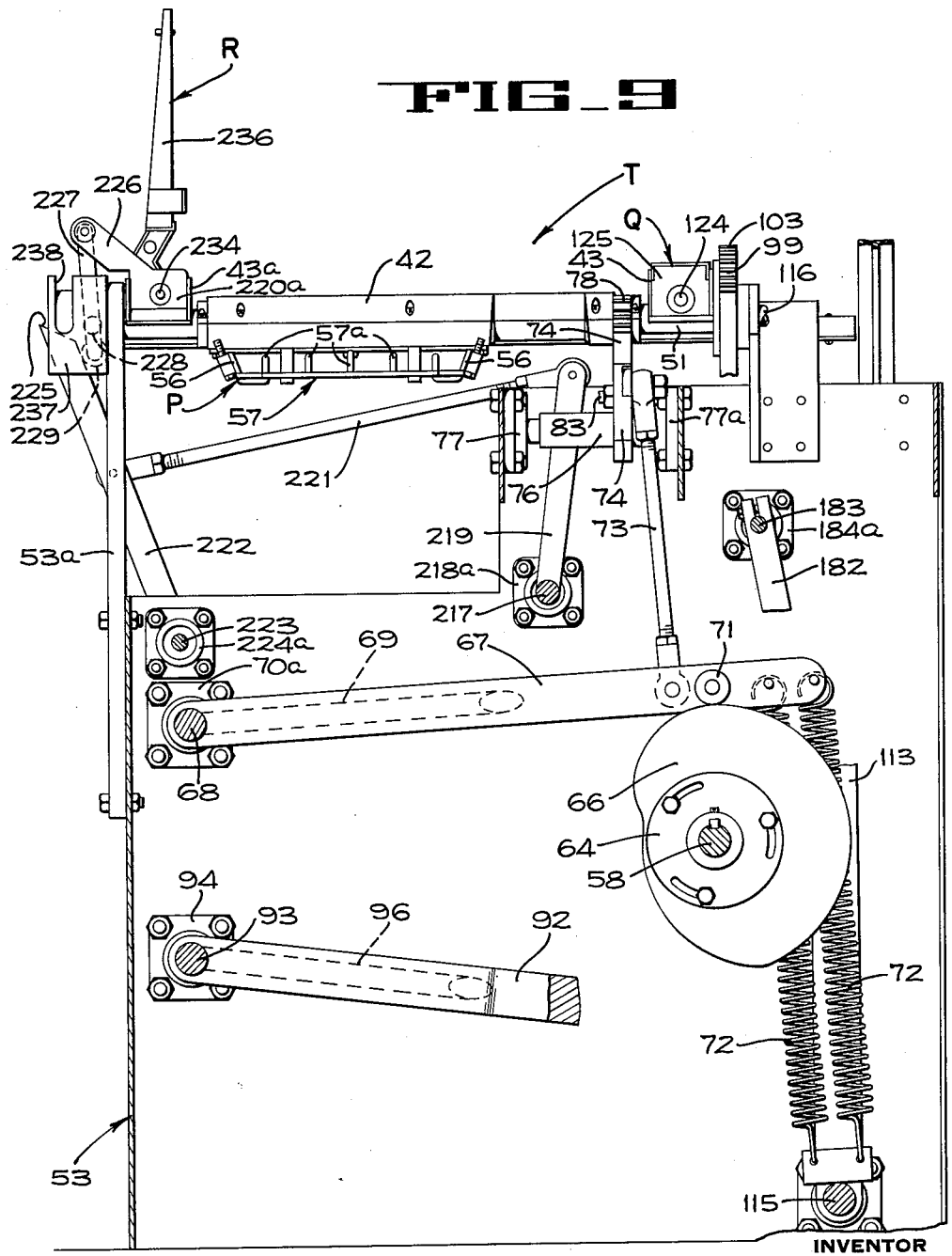

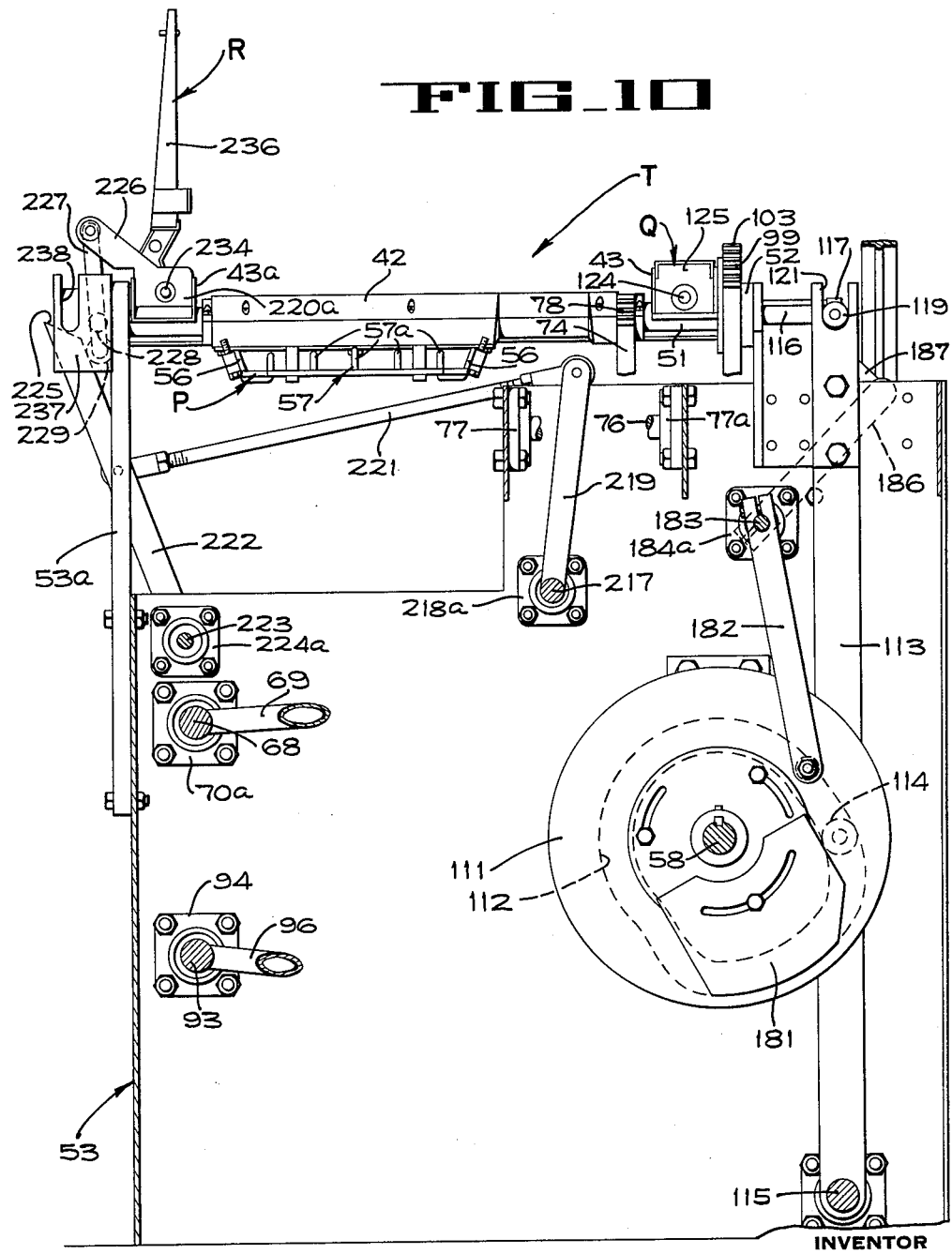

Dec. 28, 1965   H. J. MUMMA   3,225,948
MACHINE FOR HANDLING EGGS
Filed Oct. 31, 1960   24 Sheets-Sheet 10
FIG_12
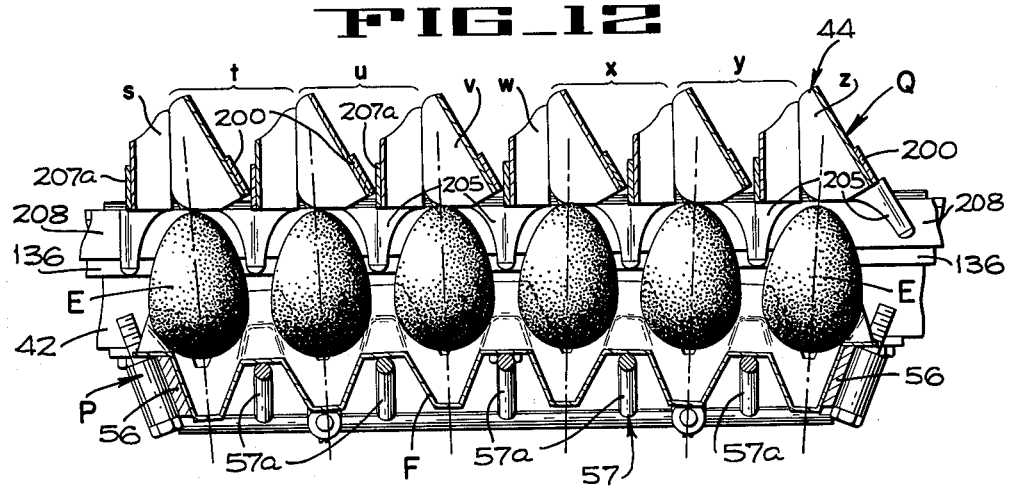
FIG_11
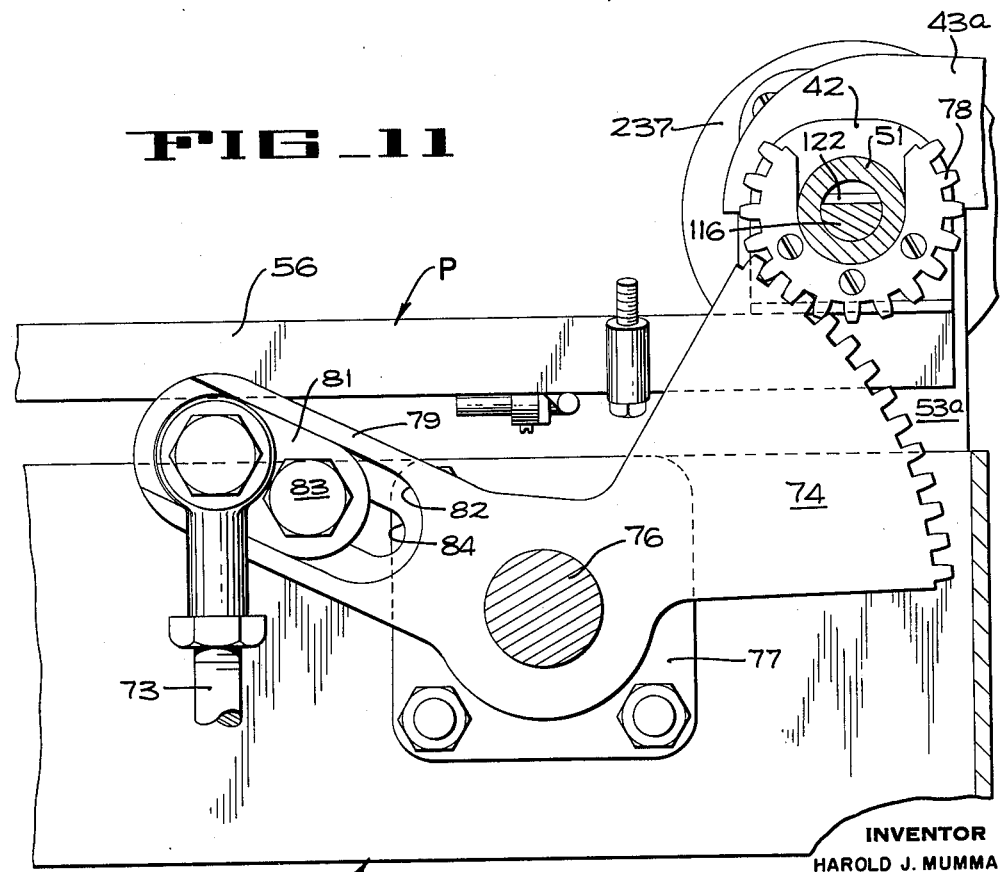
INVENTOR
HAROLD J. MUMMA
BY *Hans G. Hoffmeister*
ATTORNEY

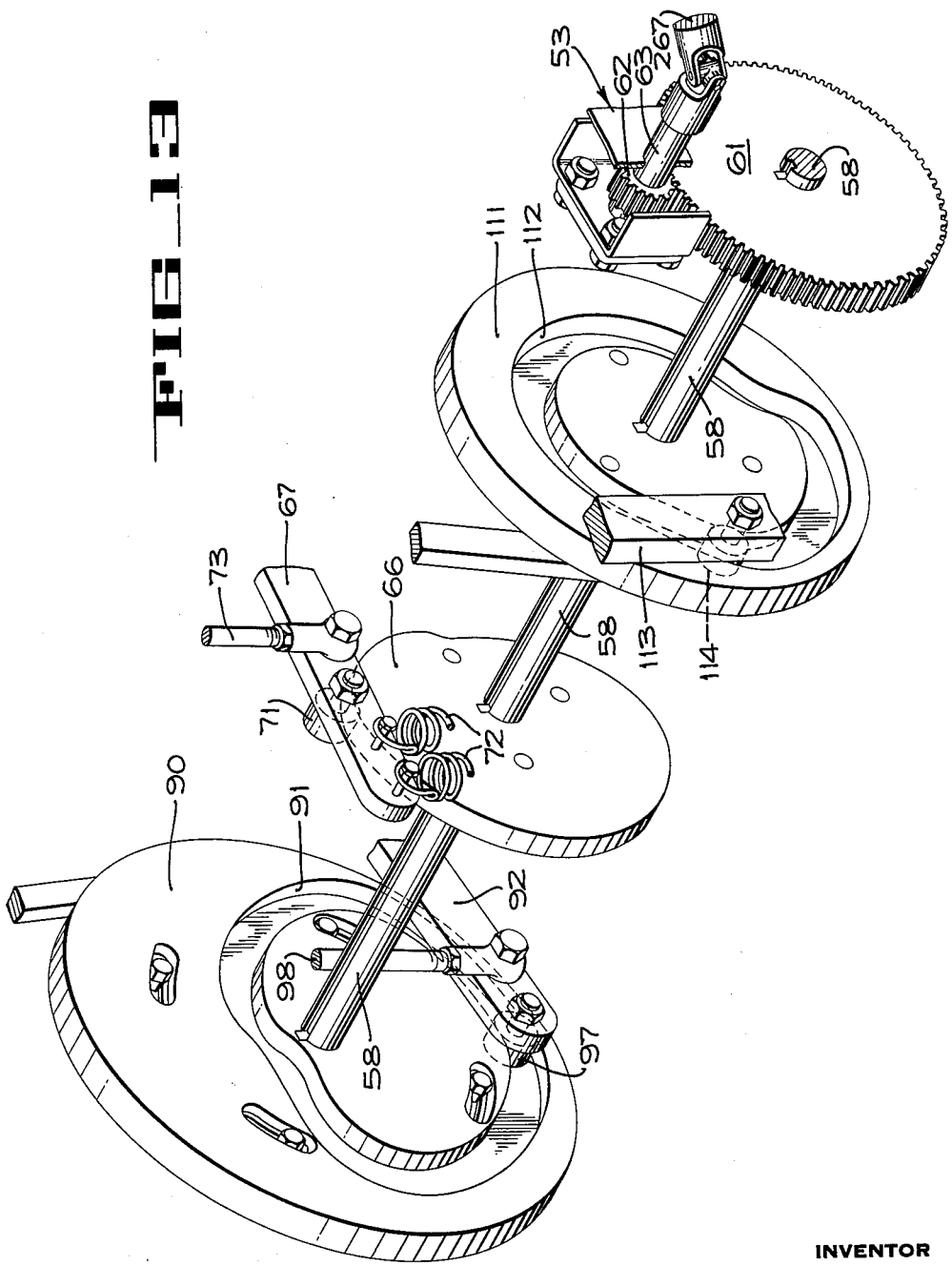

Dec. 28, 1965     H. J. MUMMA     3,225,948
MACHINE FOR HANDLING EGGS
Filed Oct. 31, 1960     24 Sheets-Sheet 12
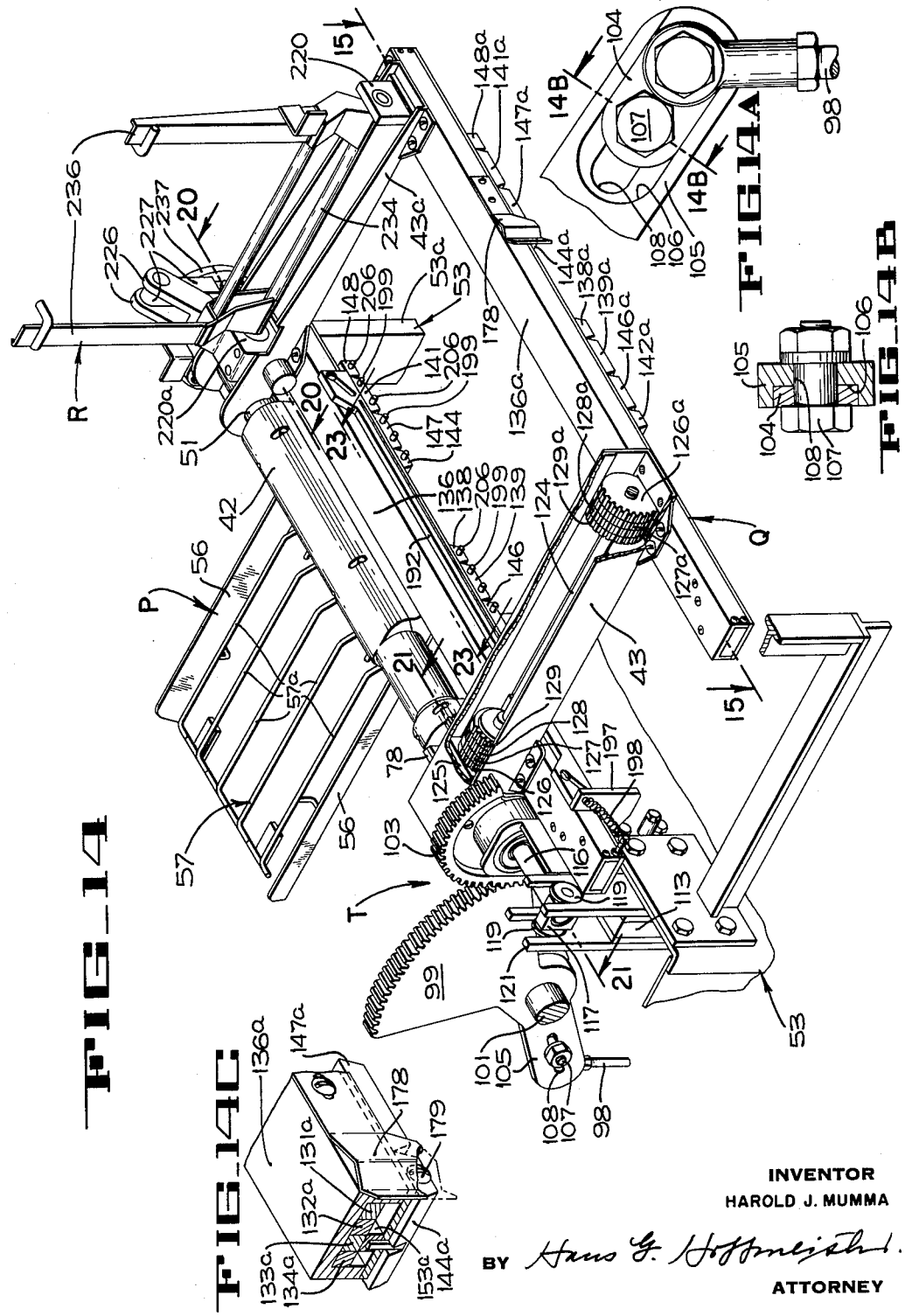
INVENTOR
HAROLD J. MUMMA
BY *Hans G. Hoffmeister*
ATTORNEY

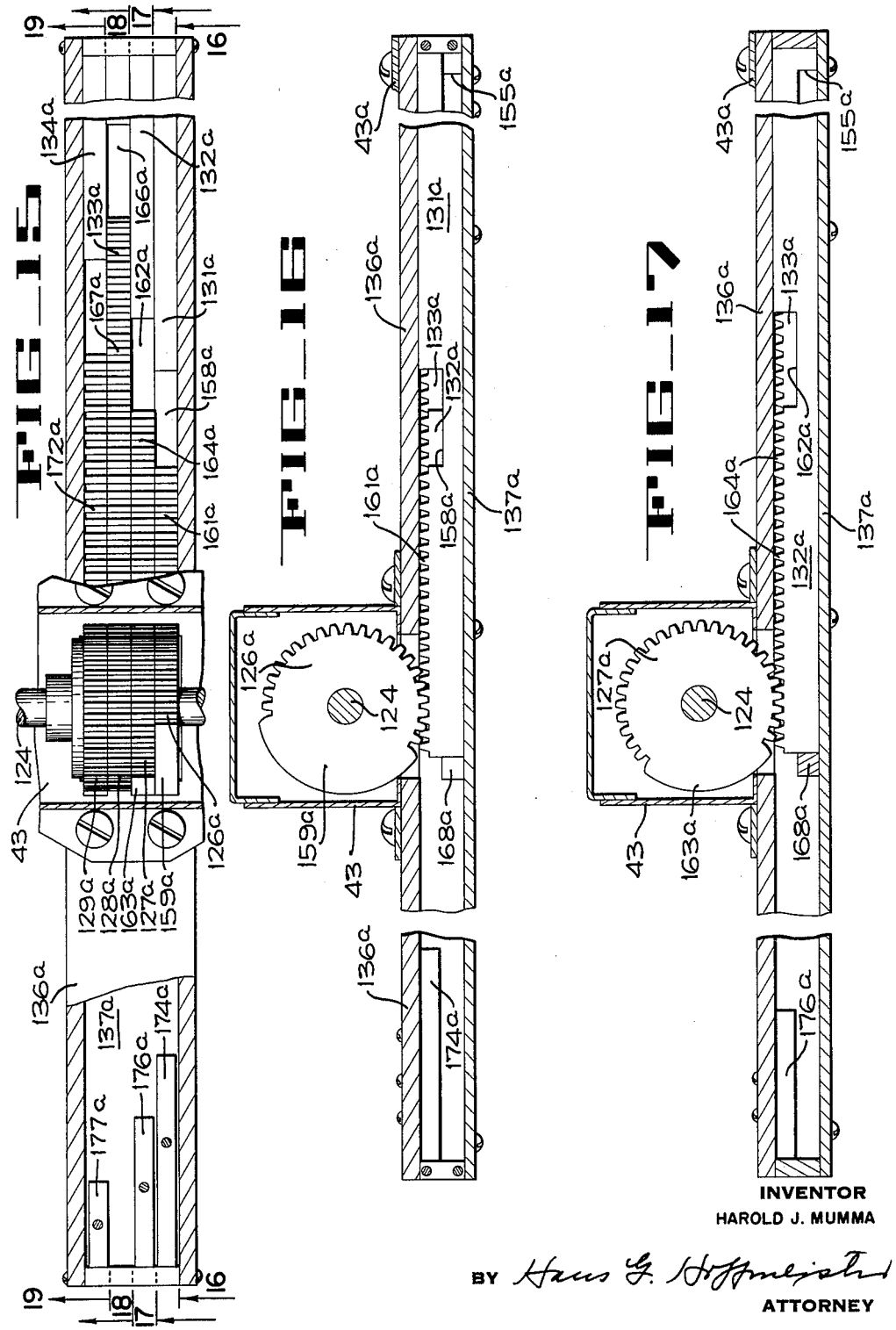

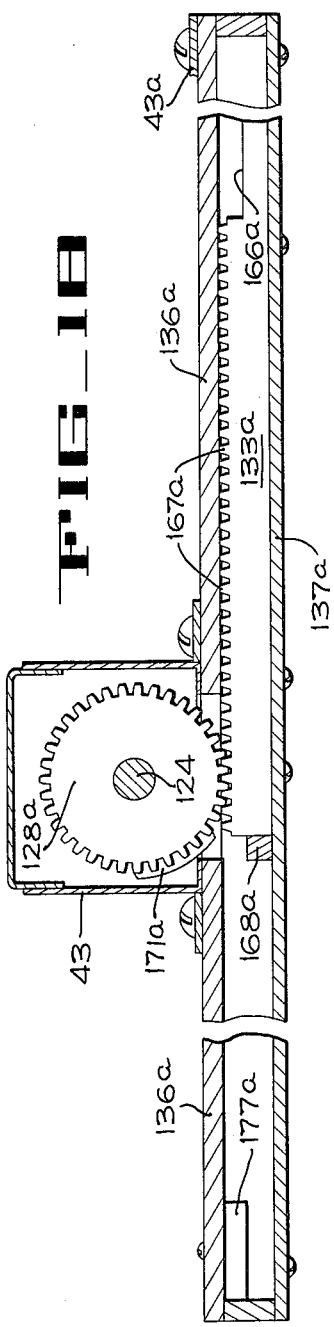
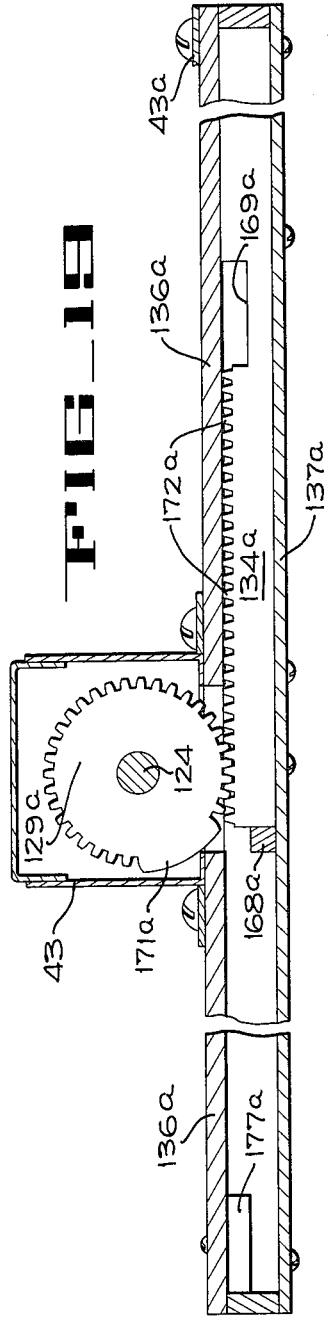

Dec. 28, 1965 H. J. MUMMA 3,225,948
MACHINE FOR HANDLING EGGS
Filed Oct. 31, 1960 24 Sheets-Sheet 15
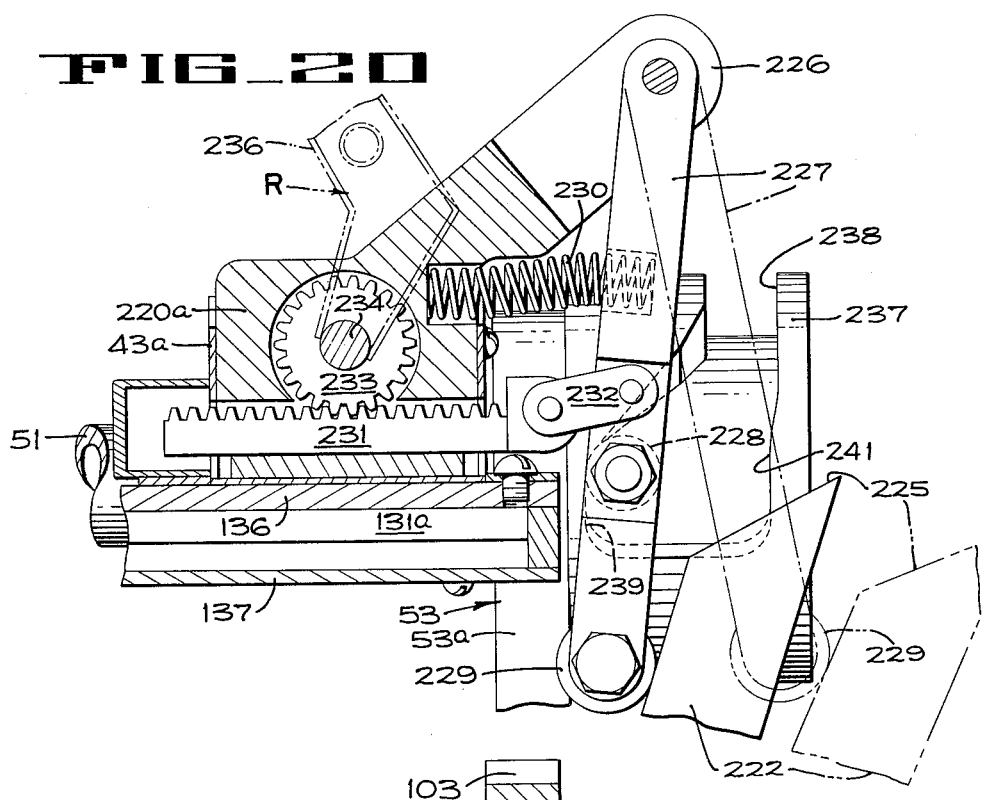
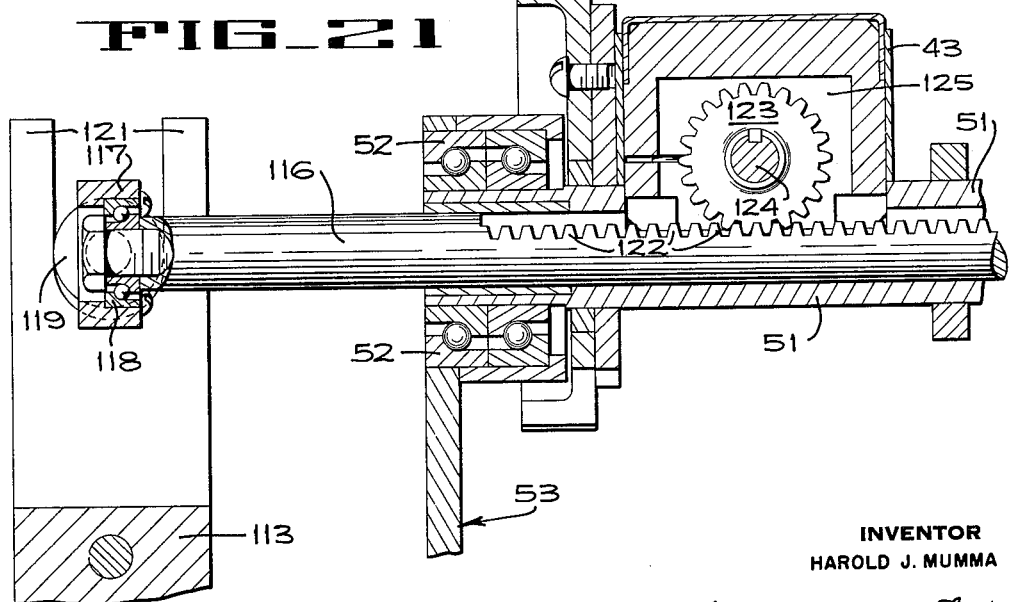
INVENTOR
HAROLD J. MUMMA
BY Hans G. Hoffmeister
ATTORNEY

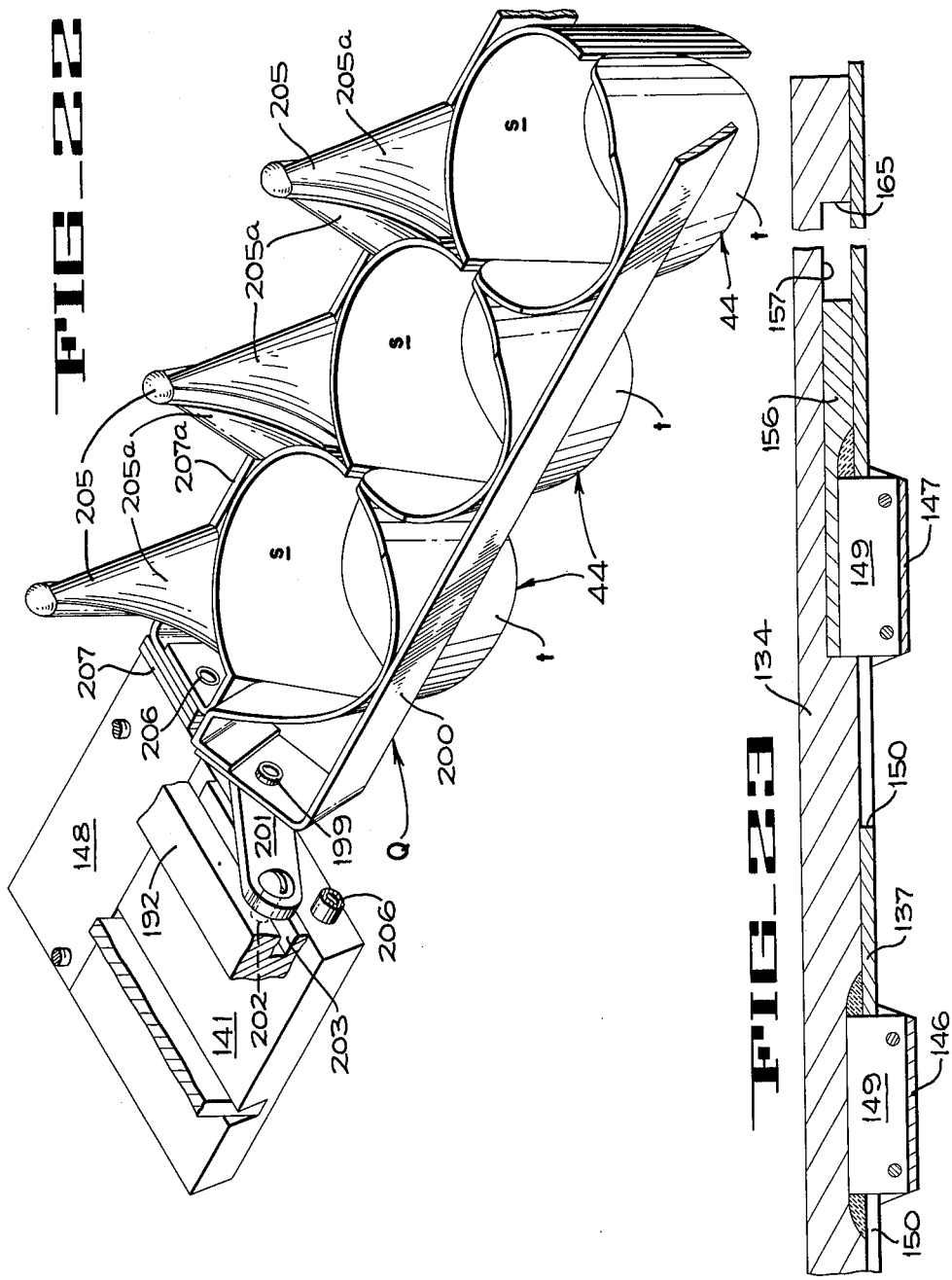

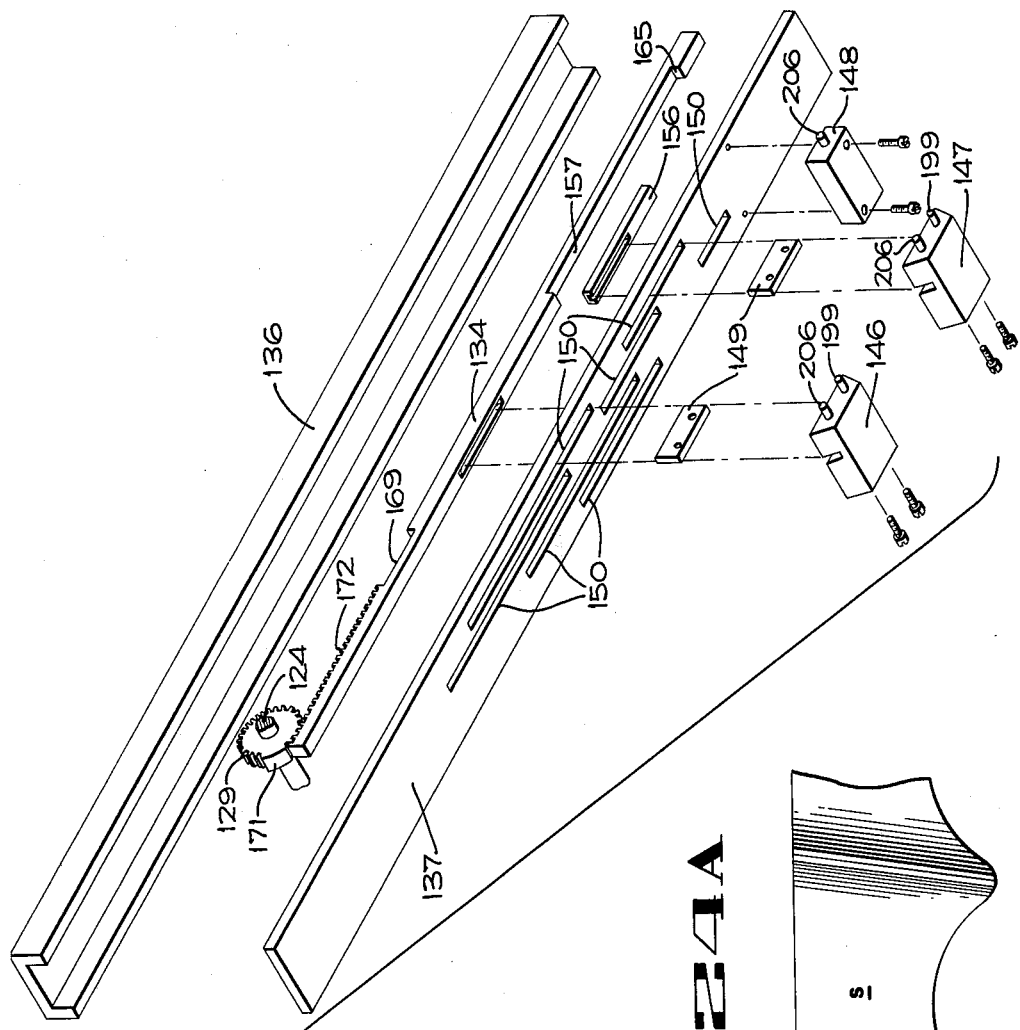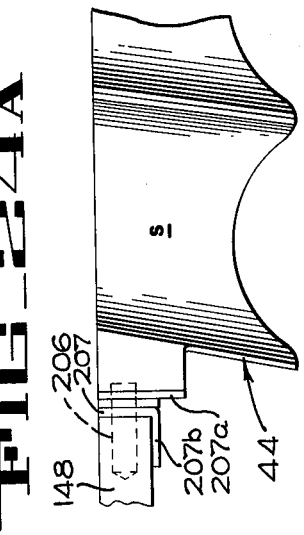

Dec. 28, 1965  H. J. MUMMA  3,225,948
MACHINE FOR HANDLING EGGS
Filed Oct. 31, 1960  24 Sheets-Sheet 18
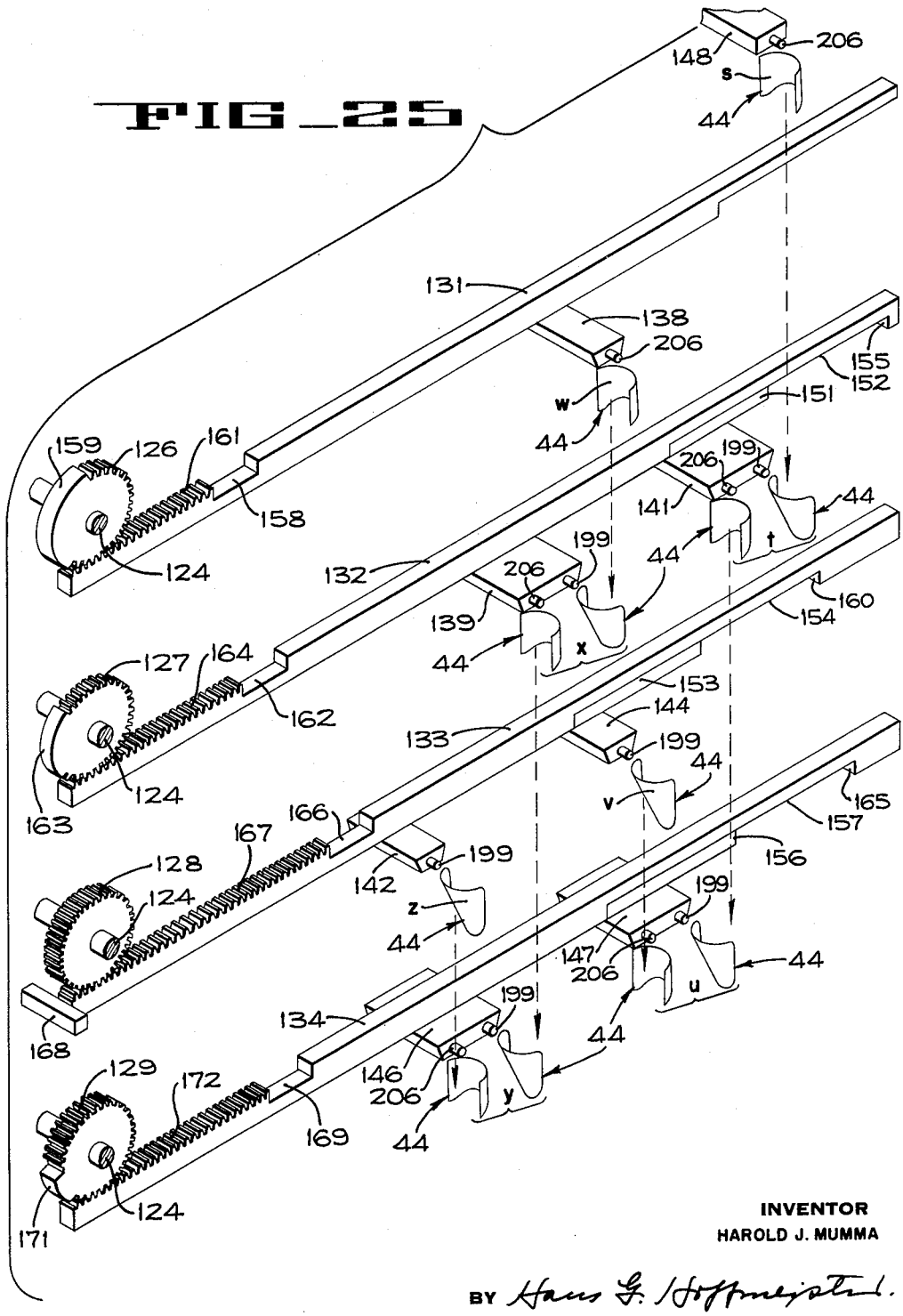
INVENTOR
HAROLD J. MUMMA
BY Hans G. Hoffmeister
ATTORNEY

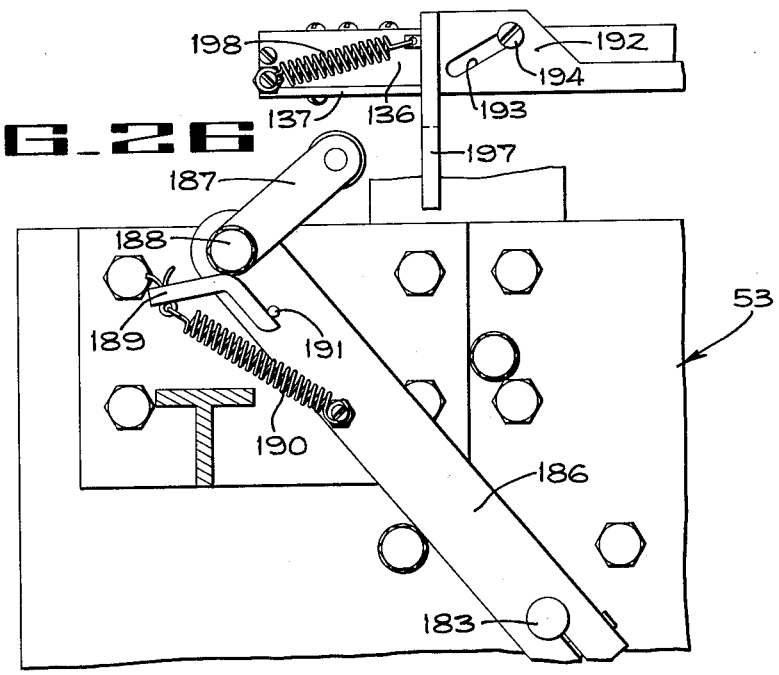
FIG_26
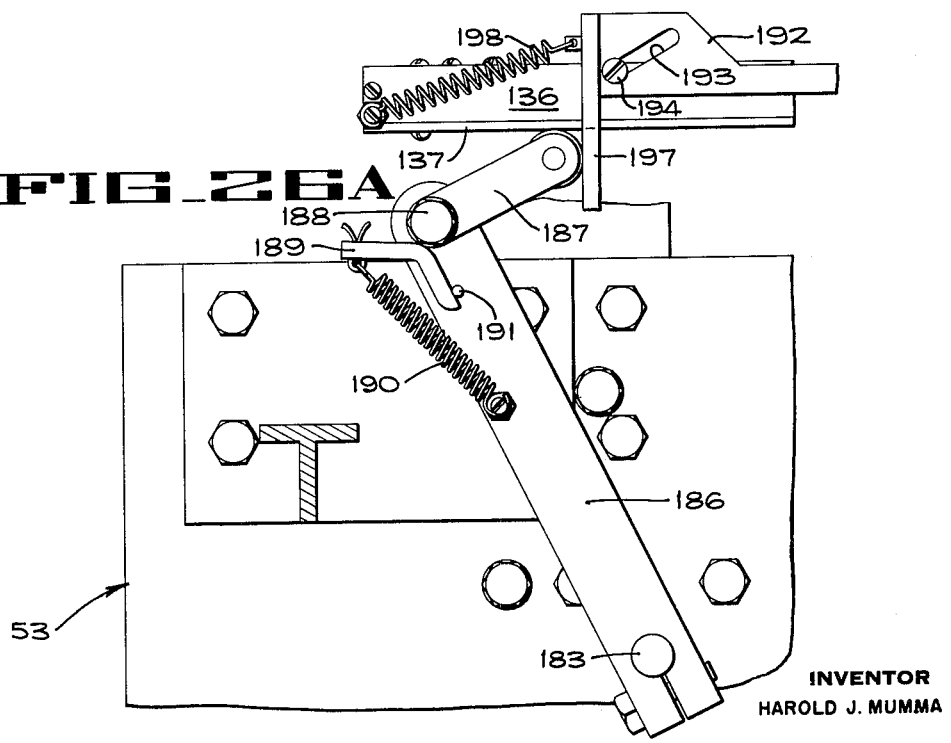
FIG_26A

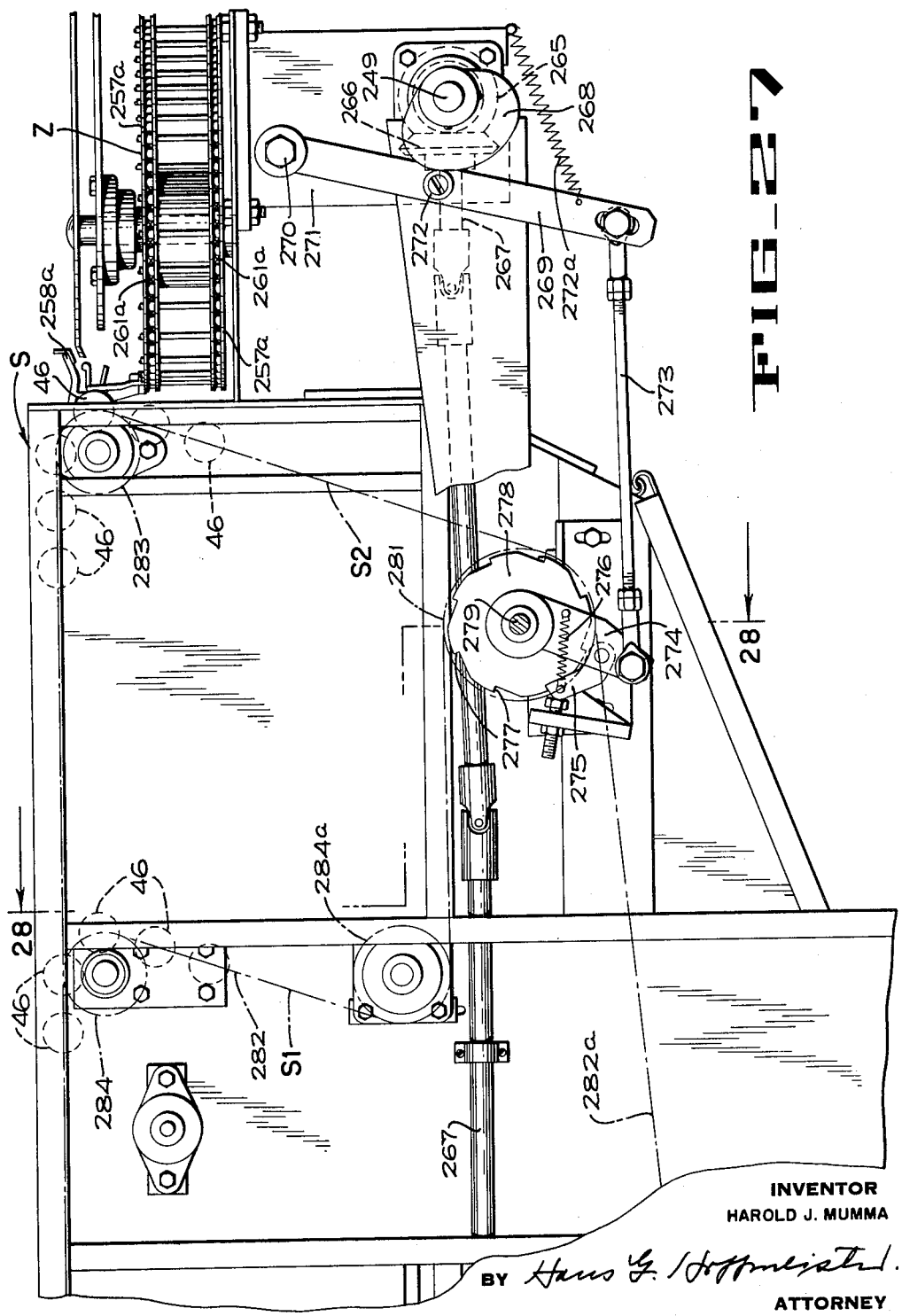

Dec. 28, 1965   H. J. MUMMA   3,225,948
MACHINE FOR HANDLING EGGS
Filed Oct. 31, 1960   24 Sheets-Sheet 21
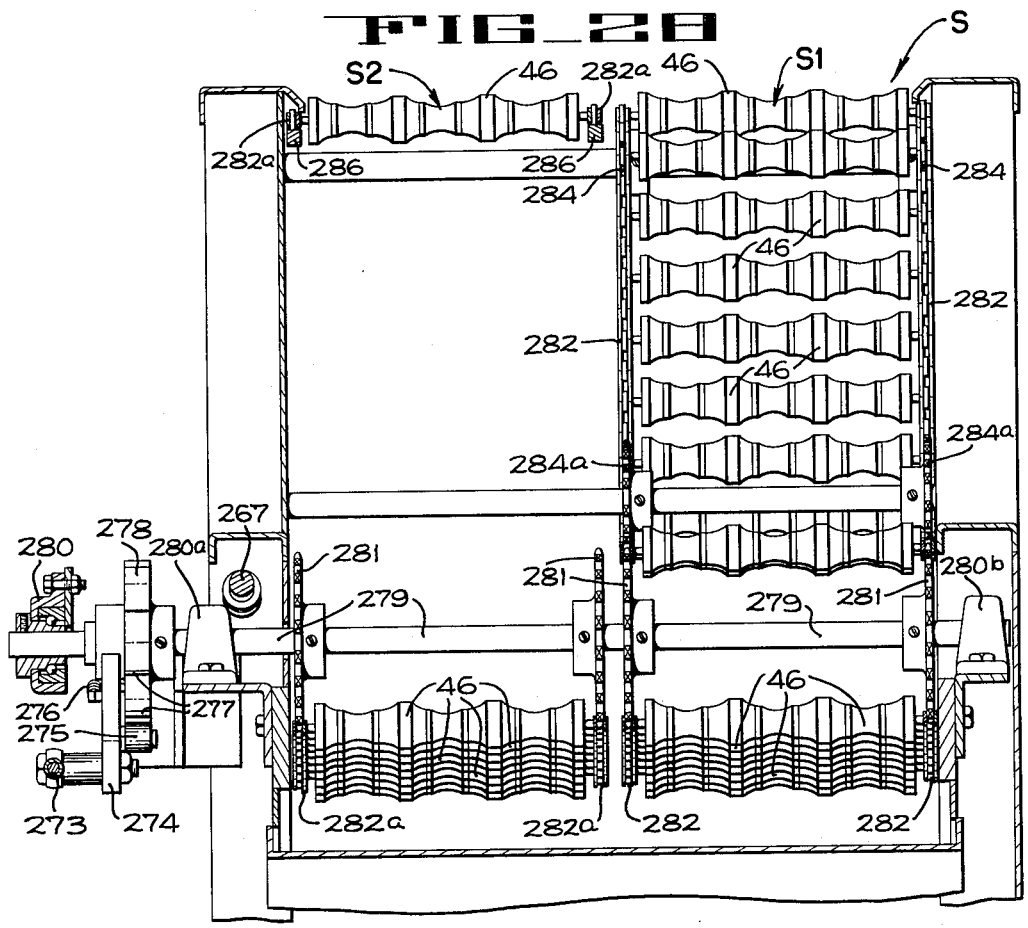
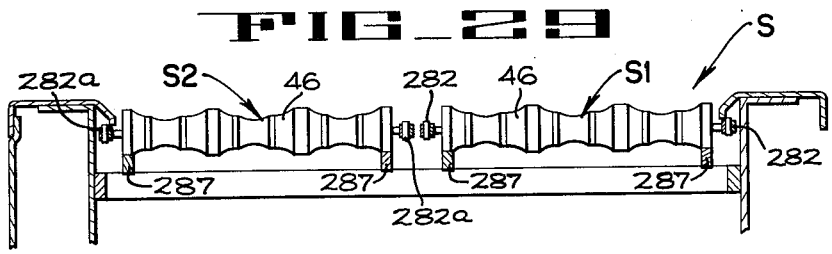
INVENTOR
HAROLD J. MUMMA
BY *Hans G. Hoffmejohn*
ATTORNEY

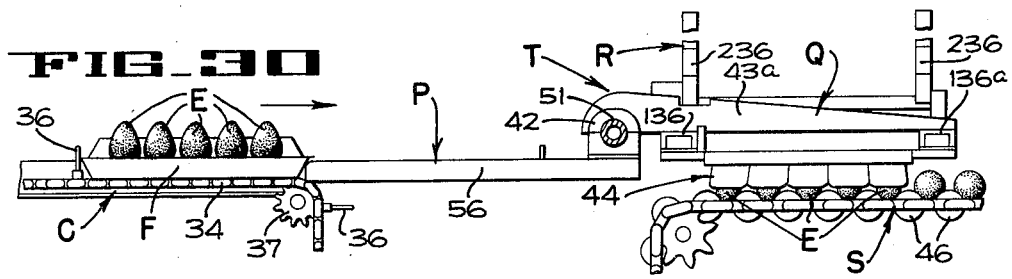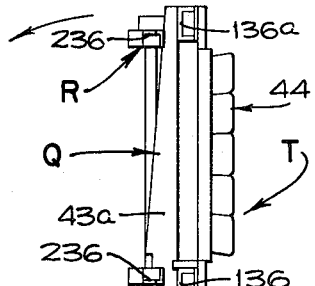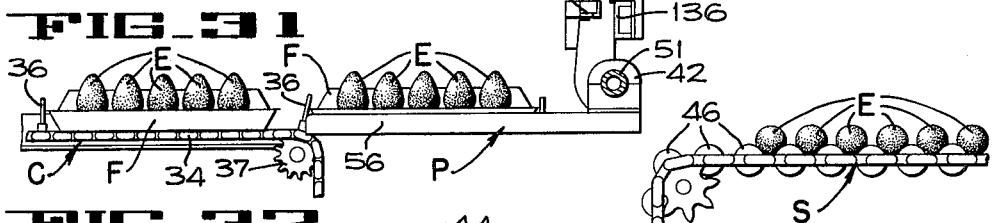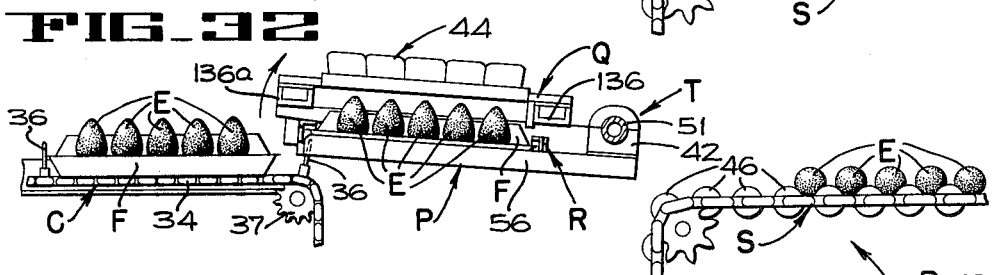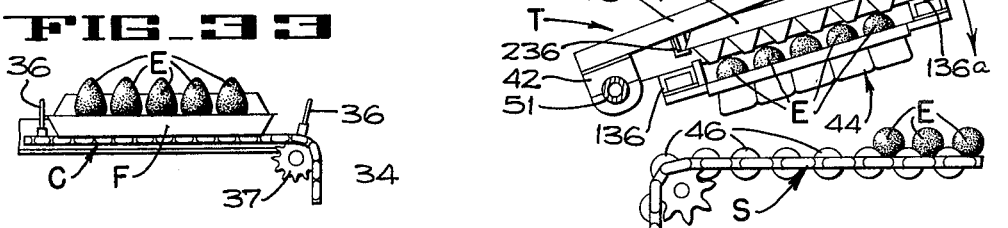

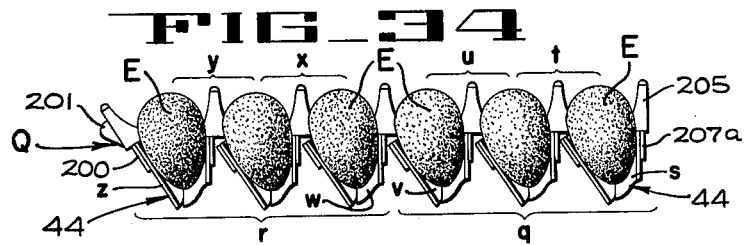
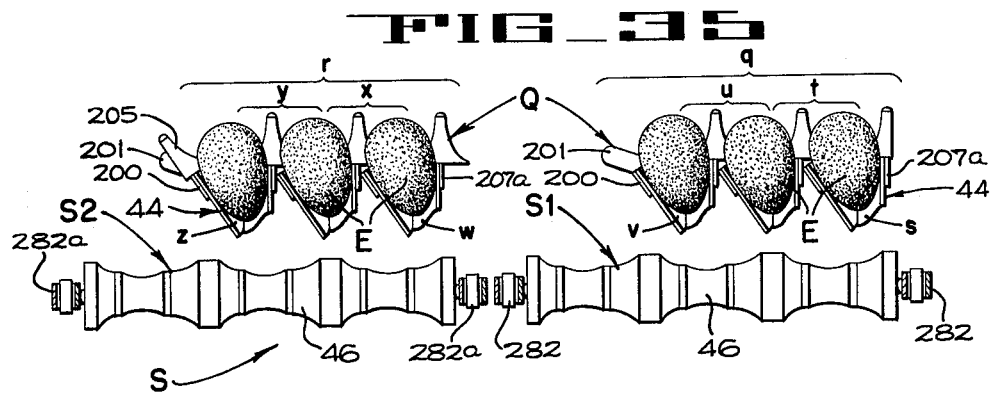
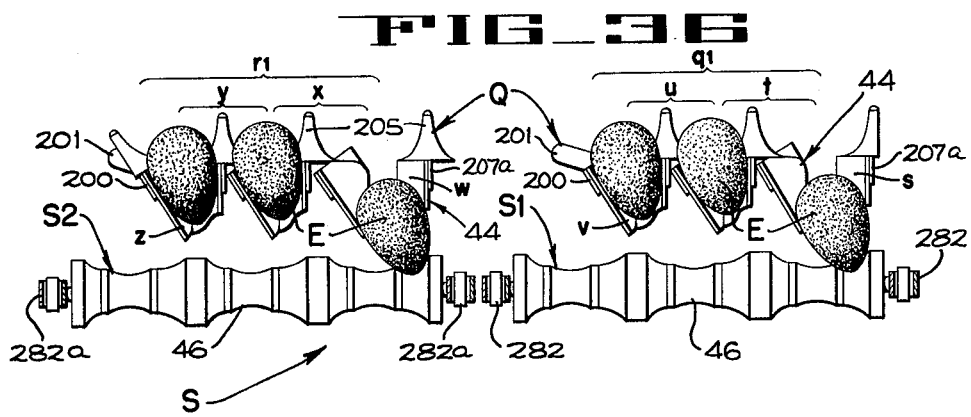

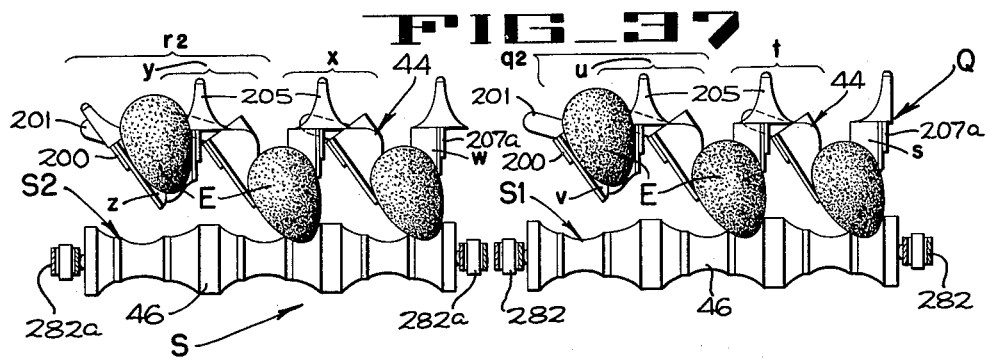
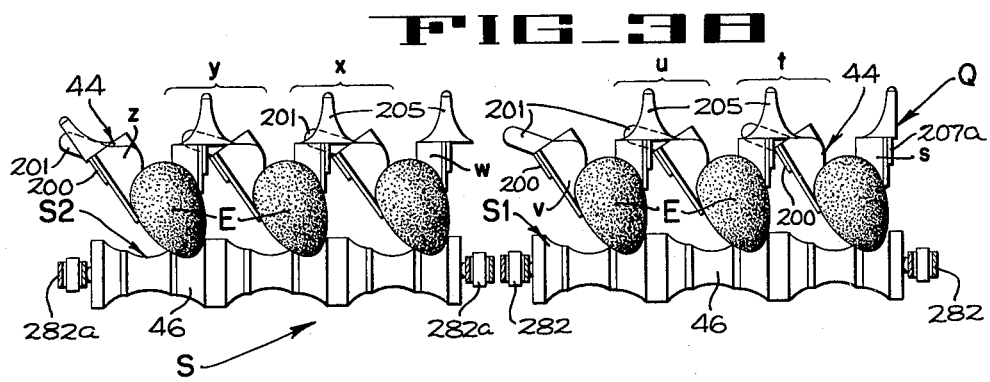
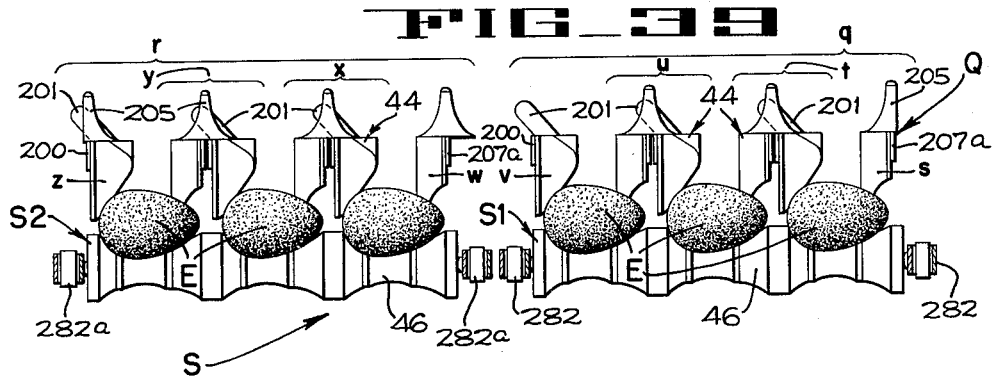

United States Patent Office 3,225,948
Patented Dec. 28, 1965

3,225,948
MACHINE FOR HANDLING EGGS
Harold J. Mumma, Riverside, Calif., assignor to FMC Corporation, a corporation of Delaware
Filed Oct. 31, 1960, Ser. No. 66,335
19 Claims. (Cl. 214—314)

This invention pertains to the art of handling eggs, and more specifically to apparatus and methods for handling eggs in bulk, that is, in cases wherein the eggs are mounted in fillers or flats each of which may carry thirty eggs.

It is known that eggs keep best if they are stored with their pointed or smaller ends down and with their air sack up, so that the eggs are in a vertical position. Eggs received from the producer are always packed in this manner and it is customary to re-pack the eggs in dozen lots or the like in the same manner, that is, in a vertical position with the pointed ends down.

An object of the invention is to provide an apparatus that automatically accepts fillers of eggs and advances them through various operating stations while always maintaining a predetermined orientation of the eggs so that after the various operations have been performed on the eggs, they can be packed automatically into cartons with their pointed ends down.

Another object of the invention is to transfer eggs that are carried vertically in flats or fillers to a conveyor which supports the eggs in a horizontal position with the small ends all oriented in the same direction, so that the eggs can be handled in groups and later packed vertically with their small or pointed ends down.

Another object of the invention is to provide for the automatic removal of the empty flats or fillers during the transfer process.

Candling or egg separator conveyors of the type to which this invention relates have rollers that are spaced or arranged to form egg receiving pockets with the eggs disposed horizontally in the pockets and with their axes extending transversely of the conveyor. The total lateral spacing of the eggs in the separator conveyor is greater than the width of the fillers or flats since the eggs are vertically disposed in the fillers on which the eggs are delivered to the conveyor. Accordingly, it is another object of the invention to provide a transfer mechanism that picks up a filler of eggs and automatically spreads the eggs as they leave the filler and are deposited into pockets in the separator conveyor, to make up for the difference in spacing just referred to.

Still another object of the invention is to provide a method and apparatus for turning the fillers of eggs upside down to remove the eggs by gravity, and means for insuring that no eggs will stick in the fillers when the fillers are lifted from the eggs.

Another object of the invention is to provide egg transfer apparatus for picking up fillers of eggs and depositing the eggs in a horizontal position in a separator conveyor, said apparatus being capable of operating at high speeds without breaking eggs.

Another object of the invention is to provide an egg transfer apparatus that is capable of picking up a filler of eggs, transferring the eggs by gravity into cups, and progressively spreading or separating the eggs from one another to match the spacing of egg receiving pockets in a separator conveyor therebelow.

Still another object of the invention is to provide egg handling and transfer apparatus of the type referred to that will transfer eggs from fillers or flats into a separator conveyor where the eggs are horizontally disposed and carried six abreast and can be discharged into a pair of single file conveyors for individual weighing, further processing and packing.

The manner in which these and other objects and advantages of the invention can be attained will be apparent from the following detailed description of the invention and the accompanying drawings.

In the drawings:

FIG. 1 is a fragmentary plan of the apparatus of the present invention, including a carton delivery conveyor, a feeder conveyor, and the apparatus for transfering eggs from fillers to a separator conveyor.

FIG. 1A is a fragmentary plan of a portion of the apparatus that forms an extension of the right-hand side of the apparatus of FIG. 1, and particularly showing the movement of eggs on the separator conveyor, past various stations, to single file conveyors which transfer the eggs to weighing scales.

FIG. 2 is a vertical section taken on line 2—2 of FIG. 1 showing the filler handling mechanism.

FIG. 3 is a vertical section taken on line 3—3 of FIG. 1 showing the egg storage or delivery conveyor.

FIG. 4 is an enlarged plan of the egg transfer apparatus of FIG. 1.

FIG. 5 is a vertical section taken on line 5—5 of FIG. 4 showing the egg cup frame and egg cups.

FIG. 6 is a vertical section taken on line 6—6 of FIG. 5.

FIG. 7 is a vertical section taken on line 7—7 of FIG. 5.

FIG. 8 is a vertical section taken on line 8—8 of FIG. 4 showing the egg cup frame cam mechanism.

FIG. 9 is a vertical section taken on line 9—9 of FIG. 4 showing the filler pickup cam mechanism.

FIG. 10 is a vertical section taken on line 10—10 of FIG. 4 showing the egg cup spreader and opener cams.

FIG. 11 is a vertical section taken on line 11—11 of FIG. 4 showing the filler pickup drive apparatus.

FIG. 12 is a transverse section through the filler pickup grid and the egg cup frame while they are positioned at the feeder conveyor showing the inclination of the axes of the eggs.

FIG. 13 is a perspective of the main cam shaft and the cams thereon, showing the drive to the cam shaft.

FIG. 14 is a perspective of a portion of the transfer apparatus.

FIG. 14A is a fragmentary plan of the crank arm on the egg frame sector gear.

FIG. 14B is a section taken on line 14B—14B of FIG. 14A.

FIG. 14C is a fragmentary perspective showing friction retarding means for a cup mounting block.

FIG. 15 is a section taken on line 15—15 of FIG. 14 showing the cup spreader racks, and showing a portion of the gear drive mechanism in plan.

FIG. 16 is a section taken on line 16—16 of FIG. 15.
FIG. 17 is a section taken on line 17—17 of FIG. 15.
FIG. 18 is a section taken on line 18—18 of FIG. 15.
FIG. 19 is a section taken on line 19—19 of FIG. 15.
FIG. 20 is a section taken on line 20—20 of FIG. 14 showing the filler ejector drive.

FIG. 21 is a section taken on line 21—21 of FIG. 14 showing the cup spreader rack drive.

FIG. 22 is a perspective showing the cup mounting.

FIG. 23 is a fragmentary enlarged section taken on line 23—23 of FIG. 14 showing the connection between the spreader racks and cup mounting blocks.

FIG. 24 is an exploded perspective showing a rack and the means for supporting cup mounting blocks.

FIG. 24A is a fragmentary side elevation of a cup and the mounting block on which it is supported.

FIG. 25 is an exploded perspective showing the four racks and associated cup mounting blocks.

FIGS. 26 and 26A are sections showing two positions of the mechanism for opening the cups.

FIG. 27 is a fragmentary side elevation taken looking in the direction indicated by arrows 27—27 of FIG. 1A and showing the drive for the separator conveyor.

FIG. 28 is a vertical section taken on line 28—28 of FIG. 27.

FIG. 29 is a vertical section taken on line 29—29 of FIG. 1A showing the mounting of the separator conveyor rollers.

FIG. 30 is a schematic diagram showing the parts in position at the start of an operation in which eggs are transferred from a filler to a conveyor.

FIG. 31 is a similar diagram showing a filler of eggs disposed on the pickup arm and the egg cup frame moving toward the pickup arm.

FIG. 32 is a diagram showing the egg cup frame disposed against the pickup arm with both members starting to move toward the egg separator conveyor.

FIG. 33 is a schematic diagram showing the egg pickup arm and eggs closely approaching the egg separator conveyor with the filler pickup member beginning to move back toward the feeder conveyor.

FIGS. 34–39 are schematic diagrams showing progressive stages in the spreading of the egg cups to match the spacing of the pockets in the separator conveyor.

GENERAL ARRANGEMENT

The general arrangement of the apparatus of the invention is seen in FIGS. 1, 1A, 2, and 3. Referring to FIG. 1 there are three delivery or storage conveyors 10 on which crates 11 of eggs, received from the poultry producer, are placed. Each crate contains two stacks of flats or fillers F which support thirty eggs E in a vertical position. Fillers are removed from the crates and placed on a feeder conveyor C, that runs transversely of the delivery ends of storage conveyors 10 and delivers fillers F and their eggs to a transfer apparatus or mechanism indicated generally at T. The feeder conveyor C is intermittently driven so that it delivers one filler of eggs at a time to the transfer apparatus. The transfer apparatus is mounted between the feeder conveyor C and an egg separator conveyor S, a portion of which is shown to the right of the transfer apparatus in FIG. 1 and the balance of which appears in FIG. 1A.

The separator conveyor S comprises a series of rollers forming egg receiving pockets in which the eggs E are disposed in a horizontal position. The transfer apparatus T picks up a filler of eggs at the feeder conveyor C and lays the eggs over the separator conveyor, spreading them and depositing them in the conveyor. During the egg transfer operation, the empty fillers F are ejected from the transfer apparatus and are received by an empty filler conveyor A (FIG. 1). This conveyor transports the empty fillers to a vertically disposed bin B FIG. 2. The bin B is substantially square in horizontal cross-section and its sides closely fit the edges of the fillers so that the fillers gently float down the bin forming a stack at the bottom thereof, being retarded by a cushion of air as they move downwardly.

Referring to FIG. 1A, after the eggs are deposited on the separator conveyor S, they are carried to a washing station W and a drying station D, which form no part of the present invention. They are then carried past a candling station indicated at X wherein the operator or candler performs what is known as a strip candling operation. Here the candler inspects the rows of eggs as they are intermittently advanced, six abreast, past the candling station, the eggs being rotated by the separator conveyor during the process.

The separator conveyor S is actually formed in two sections S1 and S2, each of which transports eggs three abreast. They move together, but at the delivery end of the separator conveyor they are offset as indicated in FIG. 1A. Section S1 delivers eggs three at a time into a single file conveyor Y which conducts them to weighing scales indicated generally at V, and section S2 extends past section S1 and delivers eggs three at a time to another single file conveyor Z which also conducts the eggs to the weighing scales. The eggs may be introduced into the weighing scales V by a mechanism such as that shown in the patent to Mumma No. 2,895,274, and further processing and packaging of the eggs after they are introduced into the scales V may be carried on in accordance with the apparatus shown in the aforesaid Mumma patent.

Various portions of the apparatus will now be described more specifically and in some detail. In order to avoid duplication of description in the part of the specification that defines the overall operation of the apparatus, the operation of the individual units or sections of the apparatus will also be briefly outlined in connection with the detailed description thereof.

THE EGG DELIVERY OR STORAGE CONVEYOR

Referring to FIGS. 1 and 3, the storage conveyor 10 is formed of three pairs of rails 12 so that three rows of egg crates 11, each containing two stacks of fillers F, may be presented to the feeder conveyor C. Mounted for free rotation in the rails 12 are rollers 13, the rails being inclined so that the crates are conducted by gravity against retractable stops 14. Stops 14 are mounted on a crossplate 16 which is pivoted to the rails at 17. Extending upwardly from the crossplate 16 are arms carrying crate-separating rollers 18, which serve to hold back the rows of crates as the leading crate is delivered from the storage conveyors. In order to release the crates, a foot pedal 19 is provided, which is pivoted at 21 to brackets 22 mounted on the rails 12 of the conveyors. The foot pedal is connected to the crossplate 16, which carry the stops 14, by means of a link 23 which is connected between the pedal 19 and a transverse reinforcing channel member 24 that extends across all of the stops. At the delivery end of the storage conveyors there is an inclined shelf 26 upon which each crate rests after it is released from the storage conveyors. Mounted on the operator's side of the feeder conveyor C is a table 27 that extends along the discharge ends of all of the storage conveyors. As indicated in FIG. 3, the crates are delivered to the storage conveyors 10 with the eggs in the fillers having their pointed ends down, which is the accepted method of storing eggs, as previously mentioned. When a crate is released to the inclined shelf 26, the eggs remain with their pointed ends down. When the crate and eggs are transferred to the table 27, the crate is turned over by the operator so that the eggs in their fillers now rest with their pointed ends up. The crates, the tops which have been opened, are then removed and the stacks of fillers F rest on the table 27 ready to be placed one by one on the feeder conveyor C.

THE FEEDER CONVEYOR

The feeder conveyor C appears in FIGS. 1, 2, 3, and 4 of the drawings. The frame of the conveyor includes a pair of longitudinally spaced vertical legs 31 which extend upwardly to the height of the operating portion of the transfer apparatus T. Extending longitudinally across the upper ends of vertical legs 31 is a top plate 32 which has side flanges 32a as seen in FIG. 3. Extending longitudinally along the mid-portion of the feeder conveyor is a guide rib 33 which is contoured in section to slide between depressions in the fillers F. The egg bearing fillers are transported to the transfer mechanism T by a pair of laterally spaced chains 34 which have pushers or flights 36 mounted thereon at a spacing slightly greater than the horizontal dimension of the fillers. In order to drive the chains 34, there are a pair of upper sprockets 37 (FIG. 1) at the delivery end of the conveyor and a pair of upper sprockets 38 at the loading end of the conveyor. The chains also pass over lower sprockets 39 (FIG. 3) at the delivery end of the conveyor and over another pair of lower sprockets at the loading end of the conveyor which are beneath the upper sprockets 38 but are not shown in the drawings. Thus, the chains pass across the upper portion of the feeder conveyor structure, then downwardly at the delivery end, back close to the floor, and upwardly at the loading end of the conveyor. There is a drive motor and reduction gearing assembly 41, FIG. 1, for driving the feeding conveyor. This drive is in the nature of a one revolution clutch or the like, arranged so that, when the motor is actuated, the feeder conveyor is advanced by a distance equal to the spacing between flights or pushers 36 so that one filler of eggs at a time is delivered to the transfer mechanism T.

TRANSFER APPARATUS—GENERAL ARRANGEMENT

The function of the transfer apparatus T is that of picking up a filler F of eggs E from the feeder conveyor C and transferring it to the egg separator conveyor S so that the eggs are deposited on the conveyor in a horizontal position at a spacing considerably greater than their spacing in the filler. It is also a function of the transfer apparatus to eject the empty fillers during the transfer process.

Referring to FIGS. 1 and 4, the transfer apparatus T includes a filler pickup member P which is in the form of an open grid-like structure, and which is pivoted on a hub 42 that is rotatably mounted on a hollow shaft 51 that is disposed transverse to the direction of motion of the feeder conveyor C. The transfer apparatus also includes an egg cup carrier or frame Q which is adjacent the pickup member P and includes spaced arms 43 and 43a, which are welded on the shaft 51. The arms 43 and 43a carry a plurality of egg cups 44, there being thirty cups in this case. As will be explained hereinafter, the thirty cups are disposed in six rows of five cups each. Each cup is made up of two segments one being pivoted and the other fixed. The pivoting segments of all five cups in each row are linked together for simultaneous movement, as seen in FIG. 22. The egg cups are also movably mounted in their carrier so that each five cup row can be shifted relative to adjacent rows so that each row of cups is disposed above a line of pockets in the separator conveyor S, which pockets are formed by adjacent pairs of hour-glass shaped rollers 46.

The empty filler ejector apparatus is indicated generally at R (FIG. 2) and is pivotally mounted on the arm 43a of the egg cup carrier Q. This apparatus, which will be described presently, removes the empty fillers from the transfer apparatus T and deposits them on belts 47 of the empty filler conveyor A, as previously described. Belts 47 may be driven by a suitable motor and reduction gearing assembly 48.

TRANSFER APPARATUS—FILLER PICKUP MEMBER

The filler pickup member P must first be positioned at the feeder conveyor C for receiving a filler F of eggs E. After the egg cup carrier Q has been pivoted to a position overlying the filler on the member P, the pickup member P and the cup carrier Q are pivoted simultaneously to position the cup carrier and the filler overlying the separator conveyor S, whereupon the pickup member P can then return to the feeder conveyor to receive the next filler. As mentioned above, the pickup member P has a hub pivotally mounted on shaft 51. This shaft 51 is mounted in opposed bearings 52 and 52a (FIG. 4) fixed in the frame structure of the apparatus, the frame being generally indicated at 53. The filler pickup member itself includes a pair of side bars 56 (FIG. 4) which are fixed to the hub 42. Mounted on the sidebars 56 is a grid indicated generally at 57 that includes five longitudinally extending rods 57a.

Referring to FIGS. 4, 9, and 13 there is a cam shaft 58, which is the master cam shaft for the apparatus. The cam shaft is largely hidden in FIG. 4 but FIG. 4 does show one end of the shaft and its outboard bearing 59, and there is a similar inboard bearing for the cam shaft that does not appear in the drawings. The cam shaft and the cams mounted thereon are illustrated in the perspective of FIG. 13 as separated from the rest of the machine. As seen in FIG. 13, the cam shaft 58 is driven with a 5 to 1 gear reduction by means of a drive gear 61 mounted on the cam shaft and a drive pinion 62 mounted on a drive shaft 63. Shaft 63 connects to a main longitudinal drive shaft for the apparatus, which shaft drives several other parts, as will be explained presently. Referring to FIG. 9, a hub 64 is mounted on the main cam shaft 58 which hub adjustably supports a filter pickup driving cam 66. A filler pickup cam follower arm 67 is mounted on a rock shaft 68 and is braced by a brace member 69 (FIGS. 4 and 9) connected to the rock shaft 68. One bearing 70 for rock shaft 68 is shown in FIG. 4 and the other bearing 70a for the shaft appears in FIG. 9. A cam follower roller 71 on the cam follower arm 67 is urged against the surface of cam 66 by means of springs 72 (FIG. 9). A link 73 is connected to arm 67 at one end, and to an arm 79 (FIG. 11) of a sector gear 74 at the other end. The sector gear is mounted on a shaft 76 which rotates in bearings 77 and 77a (FIG. 4). The sector gear meshes with a sector pinion 78 bolted to hub 42, which is the hub that carries the filler pickup grid 57, and which hub is rotatably mounted on hollow shaft 51 that carries the arms 43 and 43a of the egg cup frame carrier Q.

The sector gear 74 (FIG. 11) is oscillated by means of link 73, which link is reciprocated by the filler grid operating cam 66. In order to provide for adjustment of the throw between extreme positions of the filler pickup grid 57, link 73 is connected to a sliding block 81 which is slidably retained in a recess 82 in arm 79 and which is kept in place by a through bolt 83 that slides in a slot 84 formed in arm 79. With the mechanism just described, five rotations of the main drive shaft 63 (FIG. 13) produces one rotation of the main cam shaft 58, and one rotation of the cam shaft 58 causes the filler pickup grid 57 to move from an egg-filler receiving or starting position aligned with and in front of the feeder conveyor C, to a position overlying the egg cup carrier Q at the separator conveyor S, and then back to the starting position just described.

TRANSFER APPARATUS—EGG CUP CARRIER PIVOTING MECHANISM

Referring to FIGS. 4 and 8, the egg cup carrier Q is pivoted as a unit by a cam 90 keyed to the main cam shaft 58, which cam appears in full in FIG. 8. The cam is provided with a heart-shaped slot 91 for actuating a follower arm 92 that is pivotally mounted on a rock shaft 93. The rock shaft 93 is mounted in a pair of bearings 94 (one only being shown in FIG. 8) on the lower part of the frame structure 53. A brace 96 connects the arm 92 to the rock shaft 93, the brace appearing in FIGS. 4 and 8. A cam follower roller 97 (FIG. 8) is mounted on the end of arm 92 and rides in the cam slot 91. Connected to the cam follower arm is a link 98 that extends upwardly and connects, as best seen in FIGS. 8 and 14, to a sector gear 99. The sector gear is mounted on a shaft 101 carried in bearings 102, 102a best seen in FIG. 8. The sector gear drives a sector pinion 103 that is keyed to the hollow shaft 51 which carries the arms 43 and 43a for the egg cup carrier Q. An adjustment device similar to that provided for the filler pickup drive is provided in the actuating mechanism of the egg cup carrier. A sliding plate 104 (FIG. 14a) is carried in an arm 105, of sector gear 99, the plate being connected to link 98. The arm 105 is recessed at 106 to receive the plate 104 and there is a retaining bolt 107 which extends through a slot 108 in arm 105, for holding the plate 104 in place. This mechanism is similar to that described in connection with FIG. 11 showing the filler pickup drive, and serves to provide for adjustment of the throw between extreme positions of the egg cup carrier. In the apparatus just described, five rotations of the pinion shaft 63 (FIG. 13) will cause one rotation of the main cam shaft 58, and this will cause the egg cup carrier Q to move from its starting position overlying the separator conveyor S, to a position overlying the filler F pickup grid 57 and a filler of eggs E positioned thereon at the feeder conveyor C, and then back to the separator conveyor for depositing eggs in the latter.

TRANSFER MECHANISM—EGG CUP SPREADER MECHANISM

The function of the egg cup spreader mechanism of the transfer apparatus T is that of first positioning the empty egg cups 44 so that they substantially coincide with the eggs E vertically disposed in a filler F, and of subsequently progressively spreading the cups so that their lateral spacing substantially coincides with that of the pockets in the separator conveyor S. The spreader mechanism can be divided into two major parts. First, a cam driving apparatus and second, a rack and pinion apparatus mounted directly on the egg cup frame member carrier Q itself. The cam driving apparatus appears in FIGS. 4, 10, 13, 14, and 21. As best seen in FIGS. 4, 10, and 13 there is an egg cup spreader cam 111 keyed to the main cam shaft 58, said cam being formed with a cam slot 112. A cam follower arm 113 carries a cam follower roller 114 that rides in the cam slot 112. As seen in FIG. 10, the lower end of cam follower arm 113 is pivotally mounted in the frame 53 of the apparatus by means of a rock shaft 115. A fork 121, which is formed on the upper end of the arm 113, moves back and forth from left to right (FIG. 10) as the cam follower 114 moves along cam track 112.

The function of the cam follower arm 113 is to reciprocate a rod 116 (FIG. 21) that carries a rack 122. To accomplish this, the outboard end of rod 116 carries a shifter block 117 mounted on shaft 116 by means of bearings 118. Rollers 119 are mounted on the opposite sides of the shifter block 117, which rollers slide in the fork 121 formed at the upper end of follower arm 113. As seen in FIG. 21, the teeth of rack 122 are formed on the rod 116 which slides in the hollow shaft 51 that supports the arms 43 and 43a for the egg cup carrier Q. Rack teeth 122 mesh with a pinion 123 mounted on a cross-shaft 124, which shaft is mounted in suitable bearings 125 (only one being shown) in arm 43 of the egg carrier Q. Thus, for each rotation of the main cam shaft 58, cam follower arm 113 moves the rod 116 out, and then in again, imparting an oscillatory rotation to the pinion shaft 124.

The egg cups 44 are spread or moved relative to each other by means of a rack and pinion mechanism which includes eight pinions 126–129 and 126a–129a (FIG. 14) that are keyed to shaft 124. Four of the pinions 126a–129a are associated with four racks 131a–134a, respectively (FIG. 15), which are mounted in sliding relation in a box-like beam 136a that connects the longitudinally extending arms 43 and 43a of the egg carrier Q. There is another cross beam 136 (FIG. 14) at the other end of arms 43 and 43a, which beam contains four complementary racks 131–134 (FIG. 25). The cross beams 136 and 136a are in the form of inverted channels closed on their underside by cover plates 137 and 137a. In FIG. 15 the four racks 131a–134a are shown disposed in the beam 136a. It will be understood that the racks 131–134 are similarly slidably disposed in the beam 136.

The general arrangement of the racks 131–134 is shown in the exploded perspective of FIG. 25. Rack 131 mounts a block 138 that supports a fixed egg cup half $w$, the term "fixed" being used in the sense that cup half $w$ is not pivotally mounted on block 138. While only one cup half $w$ is shown, it will be understood that there are actually five interconnected side-by-side cup halves $w$ since there are five cups 44 in each row. The manner in which the cup halves are interconnected will be described presently. A double block 141 is mounted adjacent one end of rack 132 for supporting a group of egg cup halves indicated at $t$. One of these cup halves is pivotally mounted and cooperates with a fixed egg cup half $s$, and the outer cup half is fixed on block 141. Another block 139 is fixed on rack 132 and mounts a group $x$ of fixed and pivoted cup halves. The pivoted cup half, which is the right cup half in group $x$, cooperates with the fixed cup half $w$ on block 138 to form an egg cup. Fixed on rack 133 is a single block 142 that supports a pivoted egg cup half $z$. Also mounted on rack 133 is another single block 144 that supports a pivoted cup half $v$. Mounted on rack 134 is a double block 146 that supports a group $y$ of cup halves. A pivoted cup half, which is that to the right in FIG. 25, cooperates with a fixed cup half of group $x$ on rack 132 to form an egg cup, and a fixed cup half of group $y$ cooperates with the pivoted cup half $z$ on rack 133 to form an egg cup. Also mounted on rack 134 is another double block 147 that mounts a group $u$ of cup halves. The right hand cup in the group is a pivoted cup half that cooperates with the fixed cup half of group $t$ at rack 132 to form an egg cup. The left cup half of group $u$ is a fixed cup half that cooperates with the pivoted cup half $v$ mounted on block 144 on rack 133 to form an egg cup. At the upper right hand corner of FIG. 25 can be seen a block 148 which is fixed to the undersurface of beam 136 (not shown) and so does not move with any of the racks. This block carries the fixed cup half $s$ that cooperates with the pivoted cup half of group $t$ to form an egg cup. A similar group of four racks 131a–134a and their associated cup mounting blocks and cup groups are carried by the outboard cross-arm 136a of the egg carrier Q.

As seen in FIG. 6, a row of five interconnected non-pivoting cup segments $t$ are supported between the mounting block 141 disposed below beam 136 and the block 141a disposed below beam 136a. Similarly, the five pivoting segments $t$ are support between the two blocks 141 and 141a. This construction is followed in the case of all the cup segments, and it will be understood that the pinions 126–129 are identical to pinions 126a–129a, respectively, and the racks 131–134 are identical to racks 131a–134a so that each pair of mounting blocks, that carry the same cup halves, are actuated simultaneously.

Referring to FIGS. 23 and 24, it can be seen that the cup supporting blocks, as 147, are not mounted directly on the racks, as 134, but rather are mounted on vertical carrier plates 149 which extend upwardly through slots 150 in the cover plate 137 of beam 136 for connection to the racks or to bars, such as bar 156, that are operatively associated with the racks. A similar arrangement is provided for the other set of racks.

Returning to FIG. 25, means are provided so that some of the cup mounting blocks, namely blocks 138, 139, 142, and 146 are fixed on their respective racks whereas other cup mounting blocks, namely blocks 141, 144, and 147 can slide relative to their racks. As seen in FIG. 25 associated with rack 132 is a sliding bar 151 which mounts cup block 141 by means of plates 149 not shown in the figure. Rack 132 is notched as at 152 to receive bar 151 for relative sliding motion, the end 155 of the notch forming a block pickup abutment. Associated with rack 133 is a sliding bar 153 that mounts block 144 which bar slides in a notch 154 formed in the rack. There is a block pickup abutment 160 at the end of the notch. Associated with rack 134 is the bar 156 that mounts the cup mounting block 147 which bar slides in a notch 157 formed in the rack. There is a pickup abutment 165 at the end of the notch.

Means are provided so that although the pinion shaft 124 is oscillated through a predetermined angle of rotation in each direction by means of the drive mechanism, including the cam on the main cam shaft 58, the racks 131–134, 131a–134a themselves are moved different distances. Referring to FIGS. 15–19 and to FIG. 25, the rack assembly of FIG. 25 is that mounted in beam 136 which is the beam adjacent shaft 51. The rack assemblies of FIGS. 15 to 19 are mounted in the other beam 136a. In the description that immediately follows no distinction will be made between these two sets of racks because they are functionally identical. Rack 131 has a keeper notch 158 formed therein which is arranged to receive a blank section or locking sector 159 on the pinion 126 that drives the rack. The toothed section 161 of rack 131 is the shortest of all the racks, as is the toothed portion of drive pinion 126. The design is such that when shaft 124 is rotated, pinion 126 moves rack 131 until the locking sector 159 on the pinion enters the keeper notch 158 in the rack, whereupon further rotation of shaft 24 has no effect on the rack and the rack is locked in place by the blank section 159 on the pinion. A similar arrangement is provided for rack 132, which has a keeper notch 162 adjacent the end of the rack teeth section 164, and there is a blank portion or locking sector 163 formed on the pinion 127 that drives the rack teeth 164. The rack toothed section 164 is somewhat longer than rack toothed section 161 for rack 131, and correspondingly the keeper section 163 on the pinion is somewhat shorter, so that a single oscillation of the shaft 124 produces a longer reciprocating motion of rack 132 than it does of rack 131. Rack 133 has a notch 166 at the end of rack teeth 167; notch 166 is not a keeper notch, but it merely prevents binding in case of slight overtravel. The pinion 128 that drives rack teeth 167 has no locking sector so that rack 133 partakes of the full motion of shaft 124 during its oscillation. There is a pickup lug 168 mounted on the end of rack 133, the purpose of which is to engage the ends of all the other racks and move them one by one into mesh with their pinions on the retract or return stroke of the mechanism, which is the stroke that causes the eggs cups 44 to be moved together or closed up again. Rack 134 has a keeper notch 169 and its pinion 129 has a locking sector 171, like those previously described, except in this case the rack teeth 172 extend over a longer distance than do the rack teeth 161 and 164 on racks 131 and 132, but do not extend as far as the rack teeth 167 on rack 133.

Thus, on a single oscillation of pinion shaft 124 in response to the cam operating mechanism, the racks 131–134 and 131a–134a will be reciprocated back and forth. Rack 131 will be moved the shortest distance whereupon it will be held in place. Rack 132 will be moved somewhat farther and will then be held in place. Rack 134 will be moved still farther and will then be held in place, whereas rack 133 will be moved the farthest of all, and when rack 133 reaches its extreme position the direction of rotation of shaft 124 is reversed to retract all the racks. Referring to FIG. 15, there are stops 174a, 176a, and 177a for assisting in positioning the racks in their advanced positions. These stops cooperate with racks 131a, 133a, and 134a, respectively, and as seen in FIG. 16, for example, stop 174a clears the pickup lug 168a on rack 132a. This is true of the other stops.

It can now be seen that on one rotation of the main cam shaft 58, the cam and cam follower mechanism reciprocates the rod 116 (FIG. 21) which carries the rack teeth 122 that drives the pinion 123 on shaft 124 carrying the various rack pinions. During one half of an oscillatory cycle of rotation of shaft 124, racks 131–134, 131a–134a at each side of the egg cup carrier Q are advanced different distances whereupon, upon reversal of the direction of shaft 124, the racks are progressively picked up and returned to their initial positions, wherein all the cups 44 are close together and the spacing of the cups corresponds to that of the eggs E in a filler F.

Having completed a description on the egg cup spreading mechanism, and the principles of its operation, an egg cup spreading cycle will now be explained with references to FIGS. 25 and 34–39. When the egg cup carrier Q first approaches the pockets in the separator conveyor S, the cups 44 are disposed closely together, as seen in FIG. 34. The cups can be divided into two groups, q and r. Group q contains the fixed cup half s, a pivoted and non-pivoted cup group t, a similar group u, and a pivoted cup half v. Group r contains a non-pivoted cup w, a pivoted and non-pivoted cup group x, a similar group y and a single pivoted cup half z. The groups q and r are closed, as in FIG. 34, as the egg cup carrier approaches the separator conveyor and begin to spread or open, after the empty filler F is ejected.

The first stage in the spreading cycle is illustrated in FIG. 35 wherein group r is separated from group q, thereby bringing the cup halves or elements of group r adjacent the separator conveyor section S2. This separating action can be explained with respect to FIG. 25 wherein it is noted that block 141 mounting cup group t, block 147 mounting cup group u, and block 144 mounting a single pivoted cup half v are all mounted on bars 151, 156 and 153, respectively, that can slide relative to their respective racks 132, 134 and 133. These blocks are frictionally restrained by means of a spring clip 178 (FIG. 14C) mounted on beam 136a, which clip engages a stud 179 on cup mounting block 144a. On the other hand, the blocks mounting the cups in group r, namely blocks 138, 139, 142, and 146 are all fixed on their respective racks 131, 132, 133 and 134. Since the latter blocks mount the cup halves forming group r, the first step in the spreading operation is that illustrated in FIG. 35, wherein the cup halves of group r are separated as a body from those of group q. This is accomplished by the initial simultaneous motion of all the racks, whereby the blocks 138 (w), 139 (x), 142 (z) and 146 (y) all move together, leaving the sliding blocks in place. Rack 131 has now reached the end of its stroke and is locked in place, holding fixed cup half w in the position of FIGS. 35 and 36.

The next step in the cycle is illustrated in FIG. 36 wherein a group q1 of cup halves is separated from the fixed cup half s. Group q1 includes groups t, u and pivoted cup half v.

Referring to FIG. 25, stop 155 on rack 132 strikes bar 151 carrying block 141 (group t), stop 160 on rack 133 strikes bar 153 carrying block 144 (v) and stop 165 on rack 134 strikes bar 156 carrying block 147 (group u) to perform this separation. Simultaneously, a group r1 of cup halves, including groups x and y, and single pivoted cup half z (all mounted on blocks that are fixed to the racks), is separated from the single non-pivoted cup half w. When this occurs, rack 132 mounting cup groups t and x has reached the end of its travel and is locked in place, thereby leaving the cup groups t and x in the position illustrated in FIG. 36. The other racks 133 and 134, however, continue to move and their stop members 160 and 165, formed by the ends of the notches 154, and 157 (FIG. 25), pick up the sliding bars on their respective blocks 144 (pivoted cup half v) and 147 (group u), so that these and blocks 142 (z) and 146 (y) that are fixed to their racks, continue their motion.

Referring to FIG. 37, it will be noted that, as racks 133 and 134 continue to move, cup groups r2 and q2 are moved farther to the left in the drawings. When rack 134 reaches the end of its stroke and is held in place, blocks 146 and 147, carrying cup groups u and y, respectively, will be held in place leaving groups u and y in the position illustrated in FIG. 37. Now only rack 133 has not reached the end of its stroke. This rack mounts the single pivoted cup halves v and z, and as illustrated in FIG. 38, the final motion of rack 133 moves those cup halves to their extreme left position. Now all the cups 44 are disposed over their respective pockets in the separator conveyor sections S1 and S2, as illustrated in FIG. 38.

It will be noted that the above described separation of the cups 44 lowers the eggs E so that the pointed noses or small ends of the eggs are supported by the separator conveyor rollers 46, but the eggs have not been released from their cups. Furthermore, due to the inclined disposition of the pivoted cup halves relative to the vertical disposition of the non-pivoted cup halves, the axes of the eggs are noticeably inclined and the eggs will therefore tend to drop into horizontal positions when they are released from their cups. This action is illustrated in FIG. 39 wherein the pivoted cup halves have been opened by mechanism to be described presently, and the eggs are horizontally disposed in the separator conveyor pockets, with all the small ends pointed in the same direction. The rollers 46 of the separator conveyor S begin to rotate as soon as the conveyor advances and this rotation facilitates the quick automatic alignment of the eggs into the positions illustrated in FIG. 39.

TRANSFER APPARATUS—CUP OPENING MECHANISM

After the egg cup halves have been separated or spread by the mechanism just described, which action takes place when the cup carrier Q is overlying the separator conveyor S, the cups 44 still partially retain the eggs E and must be opened to completely deposit them in the separating conveyor in a horizontal position. This is the function of the cup opening mechanism that will now be described. Referring to FIGS. 4 and 10, the cup opening mechanism is driven by a cam 181 adjustably mounted on the cam 111 that drives the cup spreader mechanism. A cam follower arm 182 is mounted on a rock shaft 183 pivotally mounted in bearings 184 and 184a. Spaced forwardly of cam follower arm 182, as indicated in FIG. 4, is an actuating arm 186 which is likewise mounted on rock shaft 183. Pivotally mounted on the outer end of actuating arm 186 is a pusher finger 187 which is best seen in FIGS. 26 and 26a, but which also appears in FIGS. 4 and 10. Referring to FIGS. 26 and 26a, finger 187 is pivotally mounted on a bolt 188 fixed to the outer end of the actuating arm 186. Welded to the finger 187 is a spring ear 189, and a spring 190 is connected between the arm 186 and the spring ear. This spring urges the member 189 against a stop pin 191 carried by the arm 186 so that the pusher finger 187 normally occupies the position shown in FIGS. 26 and 26a. This spring mounting is merely a spring relief in case of possible jamming of the parts.

In order to open the pivoted egg cup halves in response to motion of the cam and cam arm mechanism just described, an elongated cam bar 192 shown in FIG. 5, is provided. Bar 192 is mounted on the cross beam 136 by means of screws 194 that are fastened to the beam 136 and extend through inclined slots 193 in the cam bar 192, there being one slot at each end thereof as seen in FIG. 5. A pusher plate 197 (FIG. 26) is welded to the end of cam bar 192 that is disposed adjacent the cam operated pusher finger 187. Cam bar 192 is normally held in the position shown in FIG. 26 by a spring 198 connected to member 136. When the pusher finger 187 engages the cam bar, the bar is moved to the right and elevated to the position of FIG. 26A.

The pivotal mounting of the pivoted cup halves on the mounting blocks 138, 139, 141, 142, 144–148 and the manner in which cup halves of a particular five cup row are connected together is best seen in FIGS. 7 and 22. The pivotal cup halves, as for example the halves *t* (FIG. 22), are mounted on a cross bracket 200 which is pivotally supported at each end on a pin 199 projecting from the mounting blocks 141 and 141a. Rigidly connected to the inner end of each bracket 200 is a crank arm 201 which also has a hole (not shown) at one end that receives the pin 199. At its opposite end each crank 201 has a pin 202 that rides in an elongated slot 203 formed in the cam bar 192.

The fixed cup halves, as *s*, are mounted on their associated mounting blocks, as 141 and 148, by means of pins 206, seen in FIGS. 22 and 24A, and are restrained from rotation by angle brackets 207 which have flat legs 207b (FIG. 24A) underlying the flat bottom wall of the associated mounting block. As best seen in FIG. 22, the fixed cup halves are soldered to each other and to a bracket 207a. The end cup has a tab welded to an inturned end of bracket 207a, which in turn is welded to the upstanding leg of bracket 207. Upstanding guide horns 205 are secured to each bracket 207a and the adjacent fixed cup halves. Some of the horns 205 at the edges of the cup carrier Q have one guide portion 205a, and others have two guide portions 205a. The internal horns have four guide portions 205a. These horns serve to stabilize the eggs E during the time that the grid 57 (FIG. 12), the filler F loaded with eggs, and the cup carrier Q are swung as a unit from the conveyor C to the egg release position above the separator conveyor S. Also, the horns guide the eggs toward a centered position in the cups 44 as the carrier Q approaches the separator conveyor.

As best seen in FIGS. 5 and 6, resiliently mounted webs 208 extend transversely of the egg cup carrier Q at the boundaries of each lateral row of six cup halves. The webs 208 pass through slots 205b (FIG. 7) in the horns 205 and are tensioned by springs 209 (FIG. 5) connected to spring post 210. The webs serve to resiliently and gently guide the eggs E into the cups as the egg cup 44 carrier Q approaches the separator conveyor S from a vertical position.

To summarize the operation of the cup opening mechanism, cam 181 on cam shaft 58 (FIG. 10) turns under the follower arm 182 when the egg cup carrier Q and its egg cups 44 are disposed above the pockets formed by the rollers 46 of the separator conveyor S. At this time the cam slot 112 in the cam 111, that operates the racks, as 131 to 134, and egg cup spreading mechanism, will have moved the follower arm 113 to its full right position as it is viewed in FIG. 10 and all of the cups will have been spread or separated from one another as previously described. When the cups are fully spread, the radially outer surface of cam 181 pivots the cam follower arm 182 and brings the finger 187 against the pusher plate 197 as indicated in FIG. 26A. This shifts the bar 192 to the right causing it to elevate and causing slot 203 (FIG. 5) in the cam bar 192 to lift the pins 202 on the pivoted cups and causes them to open fully and deposit the eggs E in the pockets in the separator conveyor S. The cups are then closed and the spreader mechanism retracted to bring the cups back to side-by-side relation before the egg cup carrier is pivoted to overlie the filler pickup member P to receive another filler F of eggs.

TRANSFER APPARATUS—FILLER EJECTOR MECHANISM

The filler ejector R is best shown in FIGS. 4, 8, 14, and 20, and includes a pair of ejector arms 236 (FIG. 14) that are welded to a horizontal shaft 234 which is journalled for rotation in bearings 220 and 220a. The bearings are secured to the upper surface of the arm 43a of the cup carrier Q. Thus, the ejector arms 236 are mounted for movement between the elevated position of FIG. 14 and a lowered position wherein the arms overlie the beams 136 and 136a of the cup carrier. Movement of the arms 236 is controlled by a cam 215 (FIG. 8) that is secured to the cam disc 90. A cam follower arm 216 is mounted on a rock shaft 217 which is journalled in bearings 218, 218a (FIG. 4). At one end of the rock shaft 217 is a crank arm 219 that extends upwardly from the rock shaft and connects to a transversely extending link 221, as seen in FIG. 8. The end of link 221 connects to a kicker lever 222 mounted on a rock shaft 223 which has bearings 224, 224a, these bearings appearing in FIGS. 4 and 8, respectively. The kicker lever 222 has a beveled end 225 so that it can be cammed out of the way in case of a malfunction in the apparatus. As seen in FIG. 14, the arm 43a of the egg cup carrier has a pair of ears 226 which pivotally mount a rack actuating arm 227 (FIG. 20). A cam follower roller 228 is mounted on the arm 227 intermediate its length, and a second roller 229 is rotatably mounted on the end of the arm 227 for actuation by the kicker lever 222. A spring 230 is provided which urges the arm 227 to the right in FIG. 20, toward the broken line position wherein the filler ejector arms 236 are lying flat against the egg cup carrier.

Slidably mounted in arm 43a of the egg cup carrier is a rack 231 connected to arm 227 by means of a link 232. A pinion 233 meshes with rack 231 and drives the shaft 234 that extends along arm 43a.

A stationary cam 237, which is mounted on a frame extension 53a, has a cam slot 238 formed therein for receiving the cam follower roller 228 of arm 227. The cam slot is widened at 239 to permit the arm 227 to move to the left as seen in FIG. 20 to compress spring 230. When the arm 227 is at the left, the spring 230 is compressed and the arms 236 of the filler ejector R are in the vertical position they assume after an empty filler F has been lifted from the egg cup carrier Q and ejected onto the take-away conveyor A provided for empty fillers. There is a hump 241 on the right-hand wall of the cam slot 238, as seen in FIG. 20, which is provided to lift the filler slightly to clear the eggs E so that the initial spreading action can begin.

As seen in FIGS. 4 and 8, there is a switch actuating arm 242 that is welded to the rock shaft 223 which carries the kicker lever 222. Arm 242 engages a switch 243 fixed to the frame S3 of the apparatus and starts the operation of the one revolution drive 41 (FIG. 1) of feeder conveyor C, to supply a new filler F of eggs E to the filler pickup grid 57, which grid will be positioned at the feeder conveyor when the ejector R is in the position of FIG. 8.

To summarize the operation of the filler ejector R, the spring 230 normally holds the arm 227 in the broken line position of FIG. 20. In this position, the rack 231 has rotated shaft 234 counterclockwise and the arms 236 of the ejector lie along the egg cup carrier Q. When the carrier is swung down to a position overlying a filler of eggs E on grid 57, the marginal edges of the filler F underlie the arms 236 of the ejector. As the egg cup carrier pivots from its position at the feeder conveyor C toward its position at the separator conveyor S, the cam follower 228, FIG. 20, rides along the narrow portion of cam slot 238 and the feeder ejector arms are maintained in their retracted position. Towards the end of the pivotal stroke of the carrier, the roller 228 on arm 227 rides across the hump 241 in the cam slot 238, which lifts the filler enough to clear the eggs for the cup spreading operation. Near the end of the stroke of the egg cup carrier, when the latter is disposed over the separator conveyor, and when the filler pickup grid 57 is clear and moving toward the feeder conveyor, the nose on cam 215, FIG. 8, swings the kicker lever 222 clockwise (FIG. 8) and moves it from the position shown in broken lines in FIG. 20 to the position shown in solid lines. This moves the arm 227 to the left against the force of spring 230, such motion being made possible by the fact that the cam slot is widened in this area at 239. Since the arm is moved quickly to the left by the cam and kicker lever mechanism, rack 231 rotates pinion 233 clockwise to lift the arms 236 of the ejector from their position along the egg cup carrier, to the vertical position illustrated in FIGS. 8 and 14. This upward swinging movement of arms 236 hurls the empty filler onto the take-away conveyor A. When the nose of the cam 215 passes out from under the roller on arm 216, FIG. 8, spring 230 restores the rack to its original position and urges arm 227, FIG. 20, to the right to bring roller 229 against the right-hand wall of cam slot 238. Thus, the filler ejector arms or fingers 236 are quickly brought back to their normal position against the egg cup carrier.

THE SINGLE FILE CONVEYORS

Two single file conveyors Y and Z are provided as best seen in FIG. 1A. One conveyor Y receives eggs E three at a time for section S1 of the separator conveyor S, and the other conveyor Z receives eggs three at a time from the other section S2 of the separator conveyor S. These single file conveyors run continuously and carry the eggs to the scales V, which in this example will include six individual egg weighing scales such as the scales disclosed in the aforesaid Mumma patent.

The single file conveyors Y and Z are driven from the main drive shaft 246 that runs along the entire machine, and drives other portions of the machine such as the transfer apparatus, not shown, and the scales. Mounted on shaft 246 is a bevel gear 247 which meshes with a bevel gear 248 on a cross shaft 249. Intermediate the cross shaft 249 is a bevel gear 250 which meshes with another bevel gear 251 keyed to a vertical shaft 252. Keyed to vertical shaft 252 is a sprocket 252a which drives a chain 253 that passes around lower drive sprockets 254 and 254a. A Geneva drive indicated diagrammatically at G is inserted in shaft 252 so that sprocket 252a and chain 253 are driven intermittently although bevel gear 251 turns continuously. These sprockets drive vertical shafts 255 and 255a which drive upper sprockets 256 and 256a. As seen in FIG. 1A, the lower sprockets 254 and 254a are beneath the upper sprockets 256 and 256a. Twin chains, 257 for conveyor Y and 257a for conveyor Z, pass around the sprockets 256 and 256a, respectively. Tiltable egg carrying buckets 258 and 258a are mounted on the chains 257 and 257a, one bucket 258a and the chains 257a appearing in FIG. 27. The buckets not adjacent the separator conveyor S2 have been broken away in FIG. 27 to avoid confusion. Buckets 258, 258a can be tilted to deposit eggs in a suitable receiving mechanism within the scales V in accordance with the aforesaid patent to Mumma, and the details of the bucket mounting do not form part of the present invention.

As seen in FIG. 1A, chains 257 and 257a pass around idler sprockets 259 and 259a, respectively, and around other idler sprockets 261 and 261a that are located at the sections S1 and S2 of the separator conveyor S. Thus, rotation of the main shaft 246 results in the movement of a succession of buckets 258 across the delivery end of section S1 of the separator conveyor, and a series of buckets 258a are also carried across the delivery end of section S2 of the separator conveyor. The separator conveyor is intermittently driven and the timing of Geneva drive G is such that three buckets 258 or 258a, as the case may be, move past the ends of the separator conveyor during the time required for one pair of rollers 46 to move intermittently through their alloted span of motion. The Geneva drive G is of conventional design and details thereof form no part of the invention.

DRIVE FOR THE SEPARATOR CONVEYOR

The drive for the separator conveyor S appears in FIGS. 1A and 27–29.

The separator conveyor S is driven intermittently, the conveyor advancing in steps equal to the longitudinal spacing between adjacent egg cups 44. The conveyor is driven through five such steps during one cycle of the transfer apparatus T. Referring to FIG. 1A there is a bevel gear 265 adjacent one end of the cross-shaft 249 previously described as driving the single file conveyors Y and Z. Bevel gear 265 meshes with bevel gear 266 on a longitudinally extending drive shaft 267. Shaft 267 is the shaft that drives the pinion 62 (FIG. 13) which in turn drives the cam shaft 58 at one-fifth the speed of the main drive shaft. A pawl and ratchet mechanism is provided to drive the separator conveyor S intermittently. The rows of eggs E extending transversely of the sections of the separator conveyor are advanced one at a time, and as mentioned, five rows are advanced during one cycle of operation of the transfer apparatus T, so that there will be five rows of empty pockets ready to receive eggs from the egg cups. As seen in FIG. 27, a cam 268 is mounted on the end of cross-shaft 249. A cam follower arm 269 is pivotally mounted at 270 on an extension 271 of the frame S3 of the apparatus, and the arm 269 has a roller 272 that is urged against the cam 268 by a spring 272a. Connected to the lower end of arm 269 is a link 273 that is connected to a crank arm 274 forming part of the pawl and ratchet mechanism. A pawl 275 is pivotally mounted on crank arm 274 and a spring 276 is connected between the pawl and the crank arm 274 to urge the nose of the pawl into one of a series of notches 277 formed in the periphery of a ratchet wheel 278. Ratchet wheel 278 is keyed to a cross-shaft 279 that drives the chains for the two sections S1 and S2 of the separator conveyor. The crank arm 274 pivots freely upon shaft 279, which is journalled in bearings 280, 280a, and 280b, as seen in FIG. 28. As also seen in FIG. 28, four sprockets 281 are keyed to shaft 279 for driving chains 282 of conveyor section S1 and chains 282a of conveyor section S2. As seen in FIG. 27, there are idler sprockets 283 for chains 282a the delivery end of section S2, and a pair of idlers 284 and 284a are provided for chains 282 forming part of conveyor section S1.

As seen in FIG. 28 the chains 282 and 282a are supported on tracks 286 along portions of the conveyor S wherein it is not desired to have the rollers 46 rotating. This would be the portion of the conveyor that follows the candling station X in FIG. 1A. It is desired to have the rollers 46, and hence the eggs E, rotate from the portion of the conveyor beginning at the transfer apparatus T, through the washing section W, the drying section D, and the candling section X. In order to achieve this rotation, rails 287 (FIG. 29) are provided that engage rollers 46 and support them so that the rollers will be rotated by their frictional engagement with the rails.

To summarize the drive for the separator conveyor S, and referring to FIG. 27 again, it can be seen that as cross-shaft 249 rotates, the cam follower and link assembly causes oscillation of the arm 274 so that the pawl 275 engages the notches 277 in the ratchet wheel 278 one at a time, and the separator conveyor is driven intermittently. The design is such that the rotation between adjacent notches 277 advances the separator conveyor by a distance equal to the longitudinal spacing between adjacent egg receiving pockets. Since the shaft 249 and shaft 267 make five revolutions for each revolution of the cam shaft 58 (FIG. 13), the separator conveyor will be advanced five steps during one cycle of operation of the transfer apparatus T, which is enough to make five rows of egg receiving pockets available for the reception of eggs deposited from the cups 44 of the egg cup carrier Q.

SUMMARY OF OPERATION

The mechanical construction and operation of the individual sub-assemblies or units of the apparatus of this invention have been described in detail. A brief summary of the entire operation will now be described without repeating the detailed descriptions of the operations of the individual units or sub-assemblies of the apparatus. Referring to FIG. 3, the crates 11 containing fillers F of eggs E are loaded upon the storage conveyors 10 with the eggs in a vertical position, and with their small pointed ends facing down. When the foot pedal 19 is depressed, one crate of eggs slides over onto shelf 26 and comes to rest in an inclined position. The operator now folds back the top of the crate and turns the crate over, as indicated in the drawing, so that the fillers of eggs rest directly on shelf 27 with the pointed ends of the eggs up. The empty crate is then lifted clear of the stack of fillers and discarded. Fillers of eggs are then placed, as required, upon the feeder conveyor C which as previously described operates intermittently and advances one filler of eggs at a time to the transfer apparatus T.

FIGURES 30–33 are schematic diagrams showing various stages in the operation of the apparatus. The position of the elements in FIG. 30 has been referred to as the starting position. This is the position wherein the filler pickup member P is disposed adjacent the end of the feeder conveyor C, the egg cup carrier Q is disposed over the separator conveyor S, and the filler ejector R has just ejected an empty filler F. Since the shaft that drives the transfer apparatus T is driven at one-fifth the speed of the shaft that drives the feed mechanism for the separator conveyor S, five empty pockets will have been positioned under the egg carrier Q to receive eggs E transported by the egg cups 44, when the apparatus is in the starting position. The egg cups will be laterally spread as illustrated in the step-by-step views of FIGS. 34–39 as the carrier approaches and reaches the separator conveyor. As soon as the cup spreading operation is completed, and the smaller ends of the eggs rest against the rollers 46 of the separator conveyor as illustrated in FIG. 38, the cups are opened, as illustrated in FIG. 39, depositing the eggs in the separator conveyor. The eggs are guided into the pockets with their axes inclined from the vertical by the pivoted and non-pivoted cup halves, so that all eggs point in the same horizontal direction.

The egg cup carrier Q now starts moving back toward the feeder conveyor C, as illustrated in FIG. 31, and the arms of the ejector unit R are retracted against the cup carrier Q. During this time a new filler F of eggs E is pushed onto the filler pickup member P. The egg cup carrier Q continues its motion towards the filler pickup member until the cups therein overlie the eggs in the filler, as shown in FIG. 32. Due to the construction of the rods 57a (FIG. 12) of the filler pickup member, the filler F is bowed upwardly somewhat by the filler pickup member so that the axes of the eggs are inclined or diverge as illustrated in FIG. 12 thereby providing an initial slight separation of the eggs as they enter the cups 44 from the filler. Both the filler pickup member and the egg cup carrier now return toward the separator conveyor S together, as illustrated in FIG. 32. This motion continues until the position of FIG. 33 is reached, whereupon the eggs are firmly seated in the cups due to the force of gravity. The timing of the drive cams is such that the egg filler pickup mechanism P now reverses and the filler pickup grid 57 starts moving back toward the feeder conveyor C. The egg cup carrier continues to move toward the separator conveyor S.

About this time, the hump 241 in the fixed cam 237 (FIG. 20) imparts a slight kick to the filler ejector R to insure that the filler F is clear of eggs E for initial spreading. After the filler pickup grid 57 passes the vertical position, the filler ejector is in the clear and at this time the cam roller 228 (FIG. 20) will be at the wide portion of the cam groove. Accordingly, the filler kicker lever 222 will move to the left as seen in FIG. 20 to raise the ejector arms 236 and cast the empty filler out to the empty filler conveyor A (FIG. 2). The mechanism has now returned to the starting position shown in FIG. 30, with the egg cup carrier Q overlying the separator conveyor S, the ejector arms 236 in the vertical position, and, the filler pickup grid at the feeder conveyor C. As the egg carrier Q again starts moving towards the feeder conveyor, as seen in FIG. 31, the kicker lever 222 is retracted and the spring 230 (FIG. 20) moves the arm 227 to the right causing the arms 236 of the filler ejector R to resume their position against the egg cup carrier Q.

From the foregoing, detailed description of the invention, it can be seen that the apparatus maintains a predetermined orientation of the eggs throughout the transfer operation, so that they can eventually be packaged automatically with their small or pointed ends down, even though the eggs are all deposited in the separator conveyor in a horizontal position with their small ends pointing in the same direction. Mechanism is provided to make up for the discrepancy between the spacing of the eggs while in a vertical position in the fillers, and the spacing of the eggs while in their horizontal position in the separator conveyor. The empty fillers are automatically ejected during the cycle. The freeing of the eggs from the fillers is assisted by the initial action of the operator in turning the crates, and hence the fillers, upside down before he places the fillers on the feeder conveyor. By making the separator conveyor S into two sections, eggs can be deposited three abreast onto two intermittently moving single file conveyors. The step-by-step drive of the separator conveyor and its timing relative to that of the drive of the transfer mechanism insures available space for the eggs as they leave the egg cups, and makes possible a momentary dwell for initially depositing the eggs from the egg cups into the pockets in the separator conveyor. The apparatus is capable of operating at a high speed and can handle 360 eggs a minute without breakage.

The invention having thus been described, that which is claimed to be new and which is desired to be protected by Letters Patent is:

1. Apparatus for transferring eggs that are vertically disposed in a filler to an egg separator conveyor which is adapted to support the eggs horizontally for candling, said apparatus comprising a feeder conveyor for the egg-bearing filler, a pocketed egg separator conveyor spaced from said feeder conveyor, a filler transfer device mounted between said conveyors, said transfer device comprising means for picking up an egg-bearing filler from said feeder conveyor and inverting it and moving it to a position with the eggs disposed above said separator conveyor, means for engaging each egg in said filler before inversion thereof and continuously during said inversion, and means for releasing eggs from said engaging means and for depositing eggs into the pockets of said separator conveyor.

2. Apparatus for transferring eggs that are vertically disposed in a filler to an egg separator conveyor that supports the eggs horizontally for candling, said apparatus comprising a feeder conveyor for the egg bearing filler, a pocketed egg separator conveyor spaced from said feeder conveyor, a filler transfer device mounted between said conveyors, said transfer device comprising means for picking up an egg-bearing filler from said feeder conveyor and inverting it and moving it to a position wherein the eggs are disposed above said separator conveyor, means in said transfer device for increasing the lateral spacing of the eggs to match the spacing of the pockets in said separator conveyor, and means in said transfer device for depositing eggs into the pockets of said separator conveyor with the eggs disposed in a horizontal position and all pointing in the same direction.

3. Apparatus for transferring eggs that are vertically disposed in a filler to an egg separator conveyor that supports the eggs horizontally for candling and on to single file conveyors for weighing, said apparatus comprising a feeder conveyor for the egg-bearing filler, a pocketed egg separator conveyor spaced from said feeder conveyor, said separator conveyor comprising two parallel conveyor sections with their delivery ends offset from one another longitudinally of the conveyor, a filler transfer device mounted between said conveyors, said transfer device comprising means for picking up an egg-bearing filler from said feeder conveyor and inverting it to position the eggs above said separator conveyor, means in said transfer device for depositing eggs into the pockets of said separator conveyor with the eggs disposed in a horizontal position and all pointing in the same direction, empty filler ejector means on said transfer device, and a pair of single file conveyors, one file conveyor running across the delivery end of each section of said separator conveyor.

4. Apparatus for transferring eggs that are vertically disposed in a filler to an egg separator conveyor that supports the eggs horizontally for candling and on to single file conveyors for weighing said apparatus comprising a feeder conveyor for the egg-bearing fillers, a filler pickup member pivotally mounted about a horizontal axis transverse to the direction of feed of said feeder conveyor, an egg cup supporting frame pivotally mounted about substantially the same axis, openable egg cups in said frame, a pocketed egg separator conveyor spaced from said feeder conveyor, said separator conveyor comprising two parallel sections with their delivery ends offset from one another longitudinally of the conveyor, means to pivot said filler pickup member to a position in the path of fillers advanced by said feeder conveyor, means to pivot said egg cups supporting frame to a position overlying said filler pickup member with the egg cups disposed over the eggs in a filler disposed on the member, means to simultaneously pivot said egg cup supporting frame and filler pickup member for substantially half a turn about said axis to lay said egg cups over the pockets in said egg separator conveyor, means to open said cups to deposit eggs in said conveyor pockets, means to return said filler pickup member to said feeder conveyor before said egg cups supporting frame is returned to its position overlying said filler pickup member, filler ejector arms pivotally mounted on said egg cup supporting frame for pivoting movement about an axis perpendicular to the pivot axis of said frame, said filler ejector arms being positioned between said frame and said filler pickup member during the transfer motion of the latter two members from the feeder to the egg separator conveyor, means to pivot said ejector arms away from said frame while the latter is at said separator conveyor and while said filler pickup member is approaching said feeder conveyor in order to eject the empty filler that overlies said frame, and a single file conveyor running across the delivery end of each section of said separator conveyor.

5. Apparatus for transferring eggs that are vertically disposed in a filler to an egg separator conveyor that supports the eggs horizontally for candling, said apparatus comprising a feeder conveyor for the egg bearing filler, a pocketed egg separator conveyor spaced from said feeder conveyor, a filler transfer device pivotally mounted about a horizontal axis transverse to the direction of feed of said feeder conveyor, said transfer device comprising cooperating filler pickup means and egg cup means for receiving therebetween an egg-bearing filler from said feeder conveyor and inverting it to position the eggs in said egg cup means and above said separator conveyor, means in said transfer device for depositing eggs from said egg cup means into the pockets of said separator conveyor with the eggs disposed in a horizontal position in said conveyor and all pointing in the same direction, and empty filler ejector arms mounted on said transfer device.

6. Apparatus for transferring eggs that are vertically disposed in a filler to an egg separator conveyor that supports the eggs horizontally, said apparatus comprising a feeder conveyor for the egg-bearing filler, a filler pickup member pivotally mounted about a horizontal axis transverse to the direction of feed of said feeder conveyor, an egg cup carrier mounted for pivotal movement substantially about said axis, openable egg cups in said carrier, a pocketed egg separator conveyor spaced from said feeder conveyor, means to pivot said filler pickup member to a position in the path of fillers advanced by said feeder conveyor, means to pivot said egg cup carrier to a position overlying said filler pickup member with the egg cups disposed over the eggs in a filler disposed on the member, means to simultaneously pivot said egg cup carrier and filler pickup member for substantially 180 degrees about said axis to lay said egg cups over the pockets in said egg separator conveyor, means to open said cups to deposit eggs in said conveyor pockets, and means to return said filler pickup member to said feeder conveyor before said egg cup carrier is returned to its position overlying said filler pickup member.

7. Apparatus for transferring eggs that are vertically disposed in a filler to an egg separator conveyor that supports the eggs horizontally, said apparatus comprising a feeder conveyor for the egg-bearing fillers, a filler pickup member pivotally mounted about a horizontal axis transverse to the direction of feed of said feeder conveyor, an egg cup carrier mounted for pivotal movement substantially about said axis, openable egg cups in said carrier, a pocketed egg separator conveyor spaced from said feeder conveyor, means to pivot said filler pickup member to a position in the path of fillers advanced by said feeder conveyor, means to pivot said egg cup carrier to a position overlying said filler pickup member with the egg cups disposed over the eggs in a filler disposed on the member, means to simultaneously pivot said egg cup carrier frame and filler pickup member for substantially 180 degrees about said axis to lay said egg cups over the pockets in said egg separator conveyor, means to open said cups to deposit eggs in said conveyor pockets, means to return said filler pickup member to said feeder conveyor before said egg cup carrier is returned to its position overlying said filler pickup member, filler ejector arms pivotally mounted on said egg cup carrier for pivoting about an axis perpendicular to the pivot axis of said carrier, said filler ejector arms being positioned between said carrier and said filler pickup member during the transfer motion of the latter two members from the feeder to the egg separator conveyor, and means to pivot said ejector arms away from said carrier while the latter is at said separator conveyor and while said filler pickup member is approaching said feeder conveyor in order to eject the filler that overlies said carrier.

8. Apparatus for transferring eggs that are vertically disposed in a filler to an egg separator conveyor that supports the eggs horizontally, said apparatus comprising a feeder conveyor for the egg-bearing fillers, a filler pickup member pivotally mounted about a horizontal axis transverse to the direction of feed of said feeder conveyor, an egg cup carrier pivotally mounted about substantially the same axis, openable egg cups slidably mounted in said carrier for movement in a direction parallel to said pivot axis, a pocketed egg separator conveyor spaced from said feeder conveyor, means to pivot said filler pickup member to a position in the path of fillers advanced by said feeder conveyor, means to pivot said egg cup carrier frame to a position overlying said filler pickup member with the egg cups disposed over the eggs in a filler disposed on the member, means to simultaneously pivot said egg cup carrier and filler pickup member for substantially 180 degrees about said axis to lay said egg cups over the pockets in said egg separator conveyor, means for progressively sliding said cups in said carrier to increase their spacing from a spacing that substantially matches the spacing of eggs in a filler to a spacing that substantially matches that of the pockets in said egg separator conveyor, means to open said cups to deposit eggs horizontally in said conveyor pockets, and means to return said filler pickup member to said feeder conveyor before said egg cup carrier has returned to its position overlying said filler pickup member.

9. Apparatus for transferring eggs that are vertically disposed in a filler to an egg separator conveyor that supports the eggs horizontally, said apparatus comprising a feeder conveyor for the egg-bearing fillers, a filler pickup member pivotally mounted about a horizontal axis transverse to the direction of feed of said feeder conveyor, an egg cup carrier pivotally mounted about substantially the same axis, egg cups mounted in said carrier, said egg cups each comprising a fixed egg supporting member, and an opposed movably mounted egg supporting member, means to open said movably mounted members in the same direction, an egg separator conveyor spaced from said feeder conveyor, said egg separator conveyor comprising a series of parallel rotating rollers configured so that adjacent rollers cooperate to form egg receiving pockets, means to pivot said filler pickup member to a position in the path of fillers advanced by said feeder conveyor, means to pivot said egg cup carrier to a position overlying said filler pickup member with the egg cups disposed over the eggs in a filler disposed on the member, means to simultaneously pivot said egg cup carrier and filler pickup member for substantially half a turn to lay said egg cups over the pockets in said egg separator conveyor, means to open said cups to deposit eggs in said conveyor pockets, and means to return said filler pickup member to said feeder conveyor before said egg cup carrier is returned to its position overlying said filler pickup member.

10. Apparatus for transferring eggs that are vertically disposed in a filler to an egg separator conveyor that supports the eggs horizontally, said apparatus comprising a filler pickup member pivotally mounted for movement about a horizontal axis, an egg cup supporting frame pivotally mounted about substantially the same axis, openable egg cups movably mounted in said frame for motion in a direction parallel to the pivot axis, means to pivot said filler pickup member independently of said frame to a horizontal position for receiving an egg-bearing filler, means to pivot said egg cup supporting frame to a position overlying said horizontally disposed filler pickup member with the egg cups disposed over the eggs in a filler disposed on the member, means to simultaneously pivot said egg cup supporting frame and said filler pickup member for substantially half a turn to place said egg cups in a substantially horizontal position for overlying the pockets of a separator conveyor, means for progressively moving said cups in said frame in a direction parallel to said axis to increase the cup spacing from a spacing that substantially matches the spacing of eggs in a filler to a spacing that substantially matches that of the pockets in an egg separator conveyor, means to open said cups to deposit eggs horizontally in conveyor pockets, and means to return said filler pickup member to said horizontal filler-receiving position before said egg cup supporting frame has returned to its position overlying said filler pickup member.

11. Apparatus for transferring eggs that are vertically disposed in a filler to an egg separator conveyor that supports the eggs horizontally, said apparatus comprising a filler pickup member pivotally mounted about a horizontal axis, an egg cup supporting frame pivotally mounted about substantially the same axis, operable egg cups movably mounted in said frame for motion in a direction parallel to the pivot axis, means to pivot said filler pickup member independently of said frame to a horizontal position for receiving an egg bearing filler, means to pivot said egg cup supporting frame to a position overlying said horizontally disposed filler pickup member with the egg cups disposed over the eggs in a filler disposed on the member, means to simultaneously pivot said egg cup supporting frame and said filler pickup member for substantially half a turn to place said egg cups in a substantially horizontal position for overlying the pockets of a separator conveyor, means for progressively moving said cups in said frame in a direction parallel to said axis to increase the cup spacing from a spacing that substantially matches the spacing of eggs in a filler to a spacing that substantially matches that of the pockets in an egg separator conveyor, means to open said cups to deposit eggs horizontally in conveyor pockets, means to return said filler pickup member to said horizontal filler receiving position before said egg cup supporting frame has returned to its position overlying said filler pickup member, and means for ejecting the empty filler from its position overlying said egg cup supporting frame after said pickup member has cleared the frame.

12. Apparatus for transferring eggs that are vertically disposed in a filler to an egg separator conveyor that supports the eggs horizontally, said apparatus comprising a filler pickup member pivotally mounted about a horizontal axis, an egg cup supporting frame pivotally mounted about substantially the same axis, a plurality of racks slidably mounted in said frame for motion parallel to said axis, openable egg cups movably mounted in said frame under control of said racks, means to pivot said filler pickup member independently of said frame to a horizontal position for receiving an egg bearing filler, means to pivot said egg cup supporting frame to a position overlying said horizontally disposed filler pickup member with the egg cups disposed over the eggs in a filler disposed on the member, means to simultaneously pivot said egg cup supporting frame and said filler pickup member for substantially half a turn about said axis to place said egg cups in a substantially horizontal position for overlying the pockets of a separator conveyor, means for moving said racks in said frame different distances to increase the cup spacing from a spacing that substantially matches the spacing of eggs in a filler to a spacing that substantially matches that of the pockets in an egg separator conveyor, means to open said cups to deposit eggs horizontally in conveyor pockets, and means to return said filler pickup member to said horizontal filler-receving position before said egg cup supporting frame has returned to its position overlying said filler pickup member.

13. An apparatus, for handling eggs comprising means for picking up a horizontally disposed filler of vertically disposed eggs, a pocketed conveyor arranged to support eggs in a horizontal position, means for inverting the filler of eggs and placing them over said pocketed conveyor, means associated with said inverting means for increasing the spacing of the eggs in one direction to match the spacing of the conveyor pockets, and means for depositing the eggs from said inverting means into the conveyor pockets with their small ends all pointing in the same direction.

14. An apparatus for handling eggs comprising means for picking up a horizontally disposed filler of vertically disposed eggs, a pocketed conveyor arranged to support eggs in a horizontal position, means for inverting the filler of eggs and placing them over said pocketed conveyor, means associated with said inverting means for increasing the spacing of the eggs in one direction to match the spacing of the conveyor pockets, means associated with said inverting means for ejecting the empty filler, and means for depositing the eggs from said inverting means into the conveyor pockets with their small ends all pointing in the same direction.

15. An apparatus for handling eggs that are received in crates containing fillers carrying eggs with their small ends pointed down, comprising means for inverting a crate of eggs to loosen the eggs from the fillers that previously supported them, means for picking up a horizontally disposed filler of vertically disposed eggs, a pocketed conveyor arranged to support eggs in a horizontal position, means for inverting the filler of eggs and placing them over said pocketed conveyor, means associated with said inverting means for increasing the spacing of the eggs in one direction to match the spacing of the conveyor pockets, and means for depositing the eggs from said inverting means into the conveyor pockets with their small ends all pointing in the same direction.

16. An apparatus for handling eggs comprising means for picking up a horizontally disposed filler of vertically disposed eggs, a pocketed conveyor arranged to support eggs in a horizontal position, means for inverting the filler of eggs and placing them over said conveyor means associated with said inverting means for increasing the spacing of the eggs in one direction to match the spacing of the conveyor pockets, means for depositing the eggs from said inverting means into the conveyor pockets with their small ends all pointing in the same direction, first and second single file conveyors, means for transferring one half of a lateral row of eggs in the conveyor pockets to said first single file conveyor, and means for transferring the other half to said second single file conveyor.

17. In an apparatus for handling a filler of articles, such as eggs, filler pick-up means having a support surface, means mounting said pick-up means for movement between a first position with its support surface facing up to receive a filler of articles thereon and a second position with said support surface facing down, a carrier including a plurality of article receiving and releasing cups, means mounting said carrier for movement between a first position overlying said pick-up means in its first position with said cups individually over articles on a filler on said pick-up means and a second position under said pick-up means in its second position with said cups receiving and supporting their corresponding articles, means for moving said pick-up means and said carrier in unison between their respective first and second positions, and means for releasing articles downwardly from said cups in said second position of said carrier.

18. In a machine for handling articles, such as eggs, which articles are initially in a filler, article receiving means for individually engaging each of the articles in a filler disposed in a substantially horizontal position, means for supporting said articles under said receiving means, means for inverting said article receiving means with said articles held against said receiving means by said supporting means so that the articles are inverted and are held against appreciable movement during inversion and so that in the inverted position the articles are supported by said receiving means, and means for releasing the articles downwardly through said receiving means when it is in said inverted position.

19. In an apparatus for handling eggs and like articles that are disposed in a filler, a filler pick-up member pivotally mounted about a substantially horizontal axis, an egg cup carrier mounted for pivotal movement substantially about said axis and including openable egg cups, means for pivoting said carrier to a position overlying said pick-up member with the cups disposed over the eggs in a filler on said member, means for simultaneously pivoting said carrier on said member for substantially 180° about said axis so that said cups support said eggs, and means for opening said cups to release eggs downwardly from said cups.

References Cited by the Examiner

UNITED STATES PATENTS

| | | | |
|---|---|---|---|
| 2,365,007 | 12/1944 | Rideout et al. | 214—314 |
| 2,526,309 | 10/1950 | Welch | 214—307 |
| 2,577,091 | 12/1951 | Porter | 214—307 |
| 2,627,990 | 2/1953 | Page | 214—300 |
| 2,701,071 | 2/1955 | Cavalieri | 214—314 X |
| 3,028,028 | 4/1962 | Nilsson | 214—307 |
| 3,039,591 | 6/1962 | Willsey | 198—33 |
| 3,040,869 | 6/1962 | Mumma | 198—33 |

GERALD M. FORLENZA, *Primary Examiner.*

ERNEST A. FALLER, Jr., HUGO O. SCHULZ,
*Examiners.*